(12) United States Patent
Meyering et al.

(10) Patent No.: US 6,776,940 B2
(45) Date of Patent: Aug. 17, 2004

(54) PROCESS FOR MAKING A THREE-ZONE MICROPOROUS MEMBRANE

(75) Inventors: Mark T. Meyering, Middlefield, CT (US); Jack H. Vining, Coventry, CT (US); C. Thomas Badenhop, Westport, CT (US); Joseph G. Wallace, Middletown, CT (US); William R. Kelly, Moravia, NY (US)

(73) Assignee: Cuno Incorporated, Meriden, CT (US)

( * ) Notice: Subject to any disclaimer, the term of this patent is extended or adjusted under 35 U.S.C. 154(b) by 384 days.

(21) Appl. No.: 10/047,828

(22) Filed: Oct. 23, 2001

(65) Prior Publication Data

US 2002/0130435 A1 Sep. 19, 2002

Related U.S. Application Data

(60) Division of application No. 09/522,452, filed on Mar. 9, 2000, now Pat. No. 6,413,070, which is a continuation-in-part of application No. 09/040,979, filed on Mar. 18, 1998, now Pat. No. 6,264,044, and a continuation-in-part of application No. 09/040,816, filed on Mar. 18, 1998, now Pat. No. 6,090,441, and a continuation-in-part of application No. 09/022,295, filed on Feb. 11, 1998, now Pat. No. 6,056,529.
(60) Provisional application No. 60/123,459, filed on Mar. 9, 1999, and provisional application No. 60/043,181, filed on Apr. 11, 1997.

(51) Int. Cl.$^7$ ............... B05D 1/26; B05D 5/00; B29C 44/20; B29C 44/22; B32B 5/20
(52) U.S. Cl. ............... 264/45.9; 264/171.13; 427/209; 427/245
(58) Field of Search ............ 264/45.9, 171.13; 427/209, 245

(56) References Cited

U.S. PATENT DOCUMENTS

| | | |
|---|---|---|
| 1,792,414 A | 2/1931 | Cole |
| 3,639,146 A | 2/1972 | Andra et al. |
| 3,876,738 A | 4/1975 | Marinaccio et al. |
| 3,912,834 A | 10/1975 | Imai et al. |
| 3,968,292 A | 7/1976 | Pearman et al. |

(List continued on next page.)

FOREIGN PATENT DOCUMENTS

| | | |
|---|---|---|
| DE | 8907667 | 6/1990 |
| EP | 0228072 | 7/1987 |
| EP | 0540549 | 5/1993 |
| EP | 0599791 | 6/1994 |
| JP | 60076323 | 4/1985 |
| JP | 04190836 | 9/1992 |
| WO | 9200137 | 1/1992 |
| WO | 9322034 | 11/1993 |
| WO | 9323153 | 11/1993 |
| WO | 9830379 | 7/1998 |

OTHER PUBLICATIONS

PCT International Search Report for PCT/US99/00638, published May 10, 1999.

(List continued on next page.)

Primary Examiner—Leo B. Tentoni
(74) Attorney, Agent, or Firm—R. Thomas Payne; John A. Tomich

(57) ABSTRACT

Methods for manufacturing reinforced, three-zone, microporous membrane having a plurality of different possible pore sizes from at least a single mother dope batch, including formulating at least a single mother dope batch, controllably formulating the dope in at least one vessel such that the dope temperature does not exceed a predetermined maximum mixing temperature and is maintained at a temperature lower than the mixing temperature, heating a small portion of the dope to a target temperature corresponding to a specific desired pore size to be formed in at least one zone of the microporous membrane in at least one thermal manipulation apparatus cooling the dope to about room temperature or a temperature which results in a suitable and/or optimal coating viscosity, operatively connecting at least one dope application apparatus is to the at least one thermal manipulation apparatus for transporting the manipulated dope to a dope processing site.

21 Claims, 14 Drawing Sheets

U.S. PATENT DOCUMENTS

| | | |
|---|---|---|
| 3,969,548 A | 7/1976 | Hunter et al. |
| 4,086,377 A | 4/1978 | Barchi |
| 4,156,038 A | 5/1979 | Fock et al. |
| 4,203,847 A | 5/1980 | Grandine, 2nd |
| 4,340,479 A | 7/1982 | Pall |
| 4,340,480 A | 7/1982 | Pall et al. |
| 4,341,832 A | 7/1982 | Barnett et al. |
| 4,473,474 A | 9/1984 | Ostreicher et al. |
| 4,473,475 A | 9/1984 | Barnes et al. |
| 4,477,598 A | 10/1984 | Kesting |
| 4,621,678 A | 11/1986 | Hahn et al. |
| 4,645,602 A | 2/1987 | Barnes, Jr. et al. |
| 4,707,265 A | 11/1987 | Barnes, Jr. et al. |
| 4,707,266 A | 11/1987 | Degen et al. |
| 4,728,541 A | 3/1988 | Voswinckel |
| 4,770,777 A | 9/1988 | Steadly et al. |
| 4,774,038 A | 9/1988 | Ditter et al. |
| 4,837,070 A | 6/1989 | Weber et al. |
| 4,844,805 A | 7/1989 | Solomon |
| 4,871,494 A | 10/1989 | Kesting et al. |
| 4,894,157 A | 1/1990 | Johnson |
| 4,900,449 A | 2/1990 | Kraus et al. |
| 4,944,820 A | 7/1990 | McCarten |
| 4,976,901 A | 12/1990 | Beck et al. |
| 4,997,703 A | 3/1991 | Gehrig |
| 5,006,247 A | 4/1991 | Dennison et al. |
| 5,215,662 A | 6/1993 | Johnson et al. |
| 5,250,320 A | 10/1993 | Suzuki et al. |
| 5,250,404 A | 10/1993 | Sakaibara |
| 5,376,273 A | 12/1994 | Pacheco et al. |
| 5,433,859 A | 7/1995 | Degen |
| 5,444,097 A | 8/1995 | Tkacik |
| 5,458,782 A | 10/1995 | Hou et al. |
| 5,489,406 A | 2/1996 | Beck et al. |
| 5,500,167 A | 3/1996 | Degen |
| 5,523,118 A | 6/1996 | Williams |
| 5,525,376 A | 6/1996 | Leonard |
| 5,533,675 A | 7/1996 | Benecke et al. |
| 5,538,754 A | 7/1996 | Sandock |
| 5,614,095 A | 3/1997 | Degen et al. |
| 5,654,031 A | 8/1997 | Delmore et al. |
| 5,736,051 A | 4/1998 | Degen et al. |
| 5,876,500 A | 3/1999 | Kurimoto |
| 5,888,434 A | 3/1999 | Mahoney et al. |
| 6,056,529 A | 5/2000 | Meyering et al. |
| 6,090,441 A | 7/2000 | Vining, Jr. et al. |
| 6,264,044 B1 | 7/2001 | Meyering et al. |
| 6,413,070 B1 | 7/2002 | Meyering et al. |

OTHER PUBLICATIONS

PCT International Search Report for PCT/US99/00930, published May 11, 1999.

PCT International Search Report for PCT/US99/04851, published Jun. 18, 1999.

James S. Johnson, Ph.D., A New Microfiltration Membrane (undated).

PROCESS FOR MAKING A THREE-ZONE MICROPOROUS MEMBRANE

RELATED APPLICATIONS

This application is a divisional of U.S. patent application Ser. No. 09/522,452, filed Mar. 9, 2000, now U.S. Pat. No. 6,413,070, which is a continuation-in-part of commonly owned U.S. patent application Ser. No. 09/040,979, filed Mar. 18, 1998, now U.S. Pat. No. 6,264,044, and a continuation-in-part of U.S. patent application Ser. No. 09/040,816, filed Mar. 18, 1998, now U.S. Pat. No. 6,090,441, and a continuation-in-part of U.S. patent application Ser. No. 09/022,295, filed Feb. 11, 1998, now U.S. Pat. No. 6,056,529, the disclosures of each are herein incorporated by reference, to the extent not inconsistent with the present application, and U.S. Provisional Patent Application No. 60/123,459, filed Mar. 9, 1999, and U.S. Provisional Patent Application No. 60/043,181, filed Apr. 11, 1997, the disclosures of each are herein incorporated by reference, to the extent not inconsistent with the present application.

BACKGROUND OF THE INVENTION

The present application, as presently envisioned, relates to systems and methods for the manufacture of continuous, three-zone reinforced, geometrically symmetrical, microporous membranes having three distinct pore zones, each zone being formed from at least one of a plurality of different pore size producing dopes, more particularly to systems and methods for the continuous manufacture of continuous, reinforced, three-zone microporous membrane including a scrim having two sides at least substantially encapsulated within any one of a plurality pore size producing first dopes produced from a single mother dope batch and at least one additional dope presently preferably produced from the same single mother dope batch coated onto each side of the substantially encapsulated scrim prior to the first dope being quenched and, most particularly, to systems and methods for the manufacture of a geometrically symmetric, continuous, reinforced membrane having three distinct pore zones including a scrim at least substantially and preferably, completely encapsulated by a relatively large pore size middle zone produced from any one of a plurality of different pore size dopes, which may be continuously produced from a single mother dope batch and two outer zones, one on each side of the middle zone, at least one of the three zones having a pore size at least about twenty (20%) percent greater than at least one of the other zones.

Microporous phase inversion membranes are well known in the art. Microporous phase inversion membranes are porous solids which contain microporous interconnecting passages that extend from one surface to the other. These passages provide tortuous tunnels or paths through which the liquid which is being filtered must pass. The particles contained in the liquid passing through a microporous phase inversion membrane become trapped on or in the membrane structure effecting filtration. A slight pressure, generally in the range of about one half (0.5) to about fifty (50) psig (pounds per square inch gauge) is used to force fluid through the microporous phase inversion membrane. The particles in the liquid that are larger than the pores are either prevented from entering the membrane or are trapped within the membrane pores and some particles that are smaller than the pores are also trapped or absorbed into the membrane pore structure within the pore tortuous path. The liquid and some particles smaller than the pores of the membrane pass through. Thus, a microporous phase inversion membrane prevents particles of a certain size or larger from passing through it, while at the same time permitting liquid and some particles smaller than that certain size to pass through. Microporous phase inversion membranes have the ability to retain particles in the size range of from about 0.01 or smaller to about 10.0 microns or larger.

Many important micron and submicron size particles can be separated using microporous membranes. For example, red blood cells are about eight (8) microns in diameter, platelets are about two (2) microns in diameter and bacteria and yeast are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry. Microporous membranes are characterized by bubble point tests, which involve measuring the pressure to force either the first air bubble out of a fully wetted phase inversion membrane (the initial Bubble Point, or "IBP"), and the higher pressure which forces air out of the majority of pores all over the phase inversion membrane (foam-all-over-point or "FAOP"). The procedures for conducting initial bubble point and FAOP tests are discussed in U.S. Pat. No. 4,645,602 issued Feb. 24, 1987, the disclosure of which is herein incorporated by reference. The procedure for the initial bubble point test and the more common Mean Flow Pore tests are explained in detail, for example, in ASTM F316-70 and ANS/ASTM F316-70 (Reapproved 1976) which are incorporated herein by reference. The bubble point values for microporous phase inversion membranes are generally in the range of about two (2) to about one hundred (100) psig, depending on the pore size and the wetting fluid.

Methods and Systems for preparing the dope used to produce microporous membrane are known in the art. There are numerous methods of preparing the dope. Prior methods of dope preparation are discussed in background section of U.S. patent application Ser. No. 09/022,295 mentioned above under related applications.

It is also known that processing relatively large bodies of dope, such as that used in the production of microporous phase inversion membranes, is accompanied by many difficulties such as the need to formulate separate dope batches for each size pore phase inversion membrane produced as well as the problems in controlling the temperature of the dope during the batching process.

As was pointed out in the '295 application, during production runs of microporous phase inversion membrane, it is important to produce microporous phase inversion membrane having the desired pore size and/or pore size distribution.

As summarized in the '295 application, in the prior batch formulation process, the dope formulation (solvent, nonsolvent, polymer ratio) was key to controlling pore size in the microporous phase inversion membrane. Using the batch formulation method as a predictive control of pore size in microporous phase inversion membrane, microporous phase inversion membrane having a specific pore size was produced from a specifically formulated dope batch.

As described in the '295 application, thermal manipulation to change the pore size in a membrane produced from a dope has long been recognized and has been used in reprocessing out of specification dope, as discussed therein. However, this recognized property of the dope was dependent on raising the temperature of the dope to a temperature higher than that to which the dope had previously been processed. While one prior patent mentioned in the '295 application discussed controlling the process temperature as one factor in enabling continuous production of material with fixed or variable pore size from a single batch of nylon 46 solution, that prior patent failed to provide any specific temperatures other than a wide temperature range. Further, in the only example relative to varying pore size, the patent combined process temperature manipulation with the composition of the dope and the composition of the bath to effectuate the pore size change but only in one direction, from smaller to larger. There was no apparent effort to control the temperature of the solution at a specific temperature or any effort to try to lower the temperature of the solution to produce a smaller pore size.

Following the teachings of that particular prior patent, using thermal manipulation to change the pore size and viscosity of the mixture, as the solution is heated to higher temperatures, the viscosity of the dope becomes such that it might not be usable in a solution casting operation, unless controlled. Specifically, as the particular solution is heated to higher temperatures, processing problems will most likely be encountered including those related to viscosity, degassing of volatile components, foam formation and quenching problems, without adequate viscosity control.

The methods taught in that prior patent are not applicable to Marinaccio style Nylon 66 dopes and the membrane products produced therefrom, for the following reasons: 1) the patent is directed toward attempting to produce a skinned membrane, with a radically altered pore structure just below the qualifying skin layer. In this method, the quality and integrity of the skinned membrane is completely dependent on the quality of the first few microns of surface thickness. With this method, even the smallest imperfection (air entrapment, substrate fiber breach, etc.) in the skin will destroy the integrity of the product. For this reason, the methods disclosed in the patent must restrict the casting solution viscosity to a very narrow practical range, to ensure wetting of the substrate, minimization of entrapped air, and "smooth, even coating of the mixture," to ensure the integrity of the finished membrane product. There is, however, a practical limit to the solution viscosity; therefore a single stage thermal treatment and hot casting would potentially lower the viscosity to an impractical point, thus limiting the useful range of resultant pore sizes. 2) Additionally, the single stage thermal treatment and hot casting would be harmful to the resulting product, in that the volatile non-solvent components of the Marinaccio style dope (Methanol and Methyl Formate) will de-gas in an uncontrolled manner upon casting at a temperature above thirty-four degrees (34°) C. (boiling point of Methyl Formate), and form bubbles, voids and other imperfections in the surface and matrix of the membrane. These voids are not desirable in commercial microporous membrane.

In the end, the teaching of that prior patent appears ambiguous as to the effect of temperature alone on pore size because smaller pore size materials could result primarily from 1) different casting dope solution formulations, or 2) higher proportions of solvents in the bath as it was known that a range of different pore sizes could be produced from a single solution by changing the proportions of solvents in the bath.

As summarized in the background of the '295 patent application, the prior art can be described as a non-real time predictive batch-type process that uses formulation to initially control pore size and bulk reheating as a predictive thermal manipulation to produce a predictive pore size to correct an improperly formulated batch, or improperly controlled initial mix cycle, sheer speed control to introduce the nonsolvent in the preparation of the dope as a batch of liquid to be processed into a membrane and bath solvent control in order to vary the pore size. In some prior art, discussed above, at the end of the formulation process, the dope had a viscosity related to the process temperature. There was no apparent attempt to independently control the viscosity of the dope prior to moving the dope to a membrane production apparatus.

As with dope preparation, methods and systems for producing reinforced microporous membrane are also known in the art. A number of prior patents were discussed in the '979 and the '816 patent applications that have been incorporated by reference. While there appears to have been considerable effort to (1) develop methods and processes for preparing dopes which when processed into microporous membrane produce microporous membrane having a specific pore size and (2) methods and apparatus for manufacturing reinforced microporous membrane, none of these efforts appear to have resulted in a system and method including the preparation of a mother dope connected to a reinforced microporous membrane manufacturing apparatus that is capable of producing reinforced three-zone microporous membrane having any one of a plurality of different dopes in any one of the three zones.

Thus, there is a need for systems and methods for continuously manufacturing a relatively thin, geometrically symmetrical, continuous, monolithic, reinforced, polymeric microfiltration membrane having at least three independent and distinct pore size performance zones (one reinforced performance zone, presently preferably, central to the membrane structure, and two outer non-reinforced performance zones including at least one outer qualifying performance zone on one side of the central reinforced zone and a second outer non-qualifying prefilter performance zone on the other side of the central performance zone or, two outer qualifying performance zones, one on each side of the central zone) progressing through the thickness of the membrane, each zone being continuously joined throughout the membrane structure utilizing at least one mother dope batch to provide any one of a plurality of different pore size dope to any one of the three zones. Such systems and methods should produce a three-zone membrane structure by a highly robust, single unit operation, with on-line pore size and layer thickness attribute control. Such systems and methods should produce a three-zone membrane that meets the industry's long recognized need for superior performance and greater flexibility of triple layer composite structures having any one of a plurality of pore sizes in any one of the three zones. Such systems and methods for producing a three-zone membrane should provide for the relatively inexpensive manufacture in a continuous process with the capability of changing the pore size in any of the zones including changing dope batches. Such systems and methods of manufacturing a three-zone membrane should eliminate the complex production of traditional laminated single layer structure membrane and increase the range of pore sizes and manageable handling thickness that are provided by the non-reinforced zones. Such systems and methods for manufacturing a three-zone membrane should have a geometrically symmetrical structure having improved utility, flexibility, and processability into finished industrial forms (pleated cartridges, etc.) while assuring structural integrity in any one of plurality of different pore sizes in each of the three zones.

Such systems and methods of manufacturing a three-zone membrane should provide a membrane having a minimum functional thickness and maximum throughput at minimal pressure drops, high integrity and be economically produced such that there is any one of plurality of different pore sizes in each of the three zones. Such systems and methods for manufacturing a three-zone microporous membrane should include the formulation of at least one mother dope batch at a temperature equal to or below the target temperature for producing the smallest desired pore size of the possible plurality of pore sizes for each zone to be produced from the at least one mother dope batch. Such systems and methods for manufacturing a three-zone microporous membrane should provide for the elevation of selected portions of the at least one mother dope batch to any one of a plurality of target temperatures such that microporous membrane having any one of a plurality of corresponding pore sizes can be simultaneously produced from at least one mother dope batch. Such systems and methods for the manufacture of a three-zone microporous membrane should provide for the temperature control of at least a portion of the at least one mother dope batch to about $\pm 0.2°$ C. of a target temperature prior to that portion of the dope prepared at the target temperature and after cooling being transferred to at least one dope application apparatus of a reinforced, three-zone microporous membrane manufacturing system at a processing site. Such systems and methods for the manufacture of the three-zone microporous membrane should provide for the accurate control of the temperature seen by substantially all of that portion of the dope to about $\pm 0.15°$ C. prior to that portion of the dope being transferred to at least one dope application apparatus of the reinforced, three-zone microporous membrane manufacturing system. Such systems and methods for manufacturing three-zone microporous membranes should eliminate the necessity for preparing at least one dope batch according to individual unique formulations for each pore size, thus resulting in significant cost savings and flexibility in the usage of dope batches. Such systems and methods for manufacturing reinforced, three-zone microporous membranes should also provide the ability to selectively change the pore size of at least one zone of the three-zone microporous membrane being produced from the at least one mother batch after a certain amount of at least one zone of the reinforced, three-zone microporous membrane has been produced at one specific pore size and begin producing reinforced, three-zone microporous membrane having another pore size in that same zone utilizing the same at least one mother dope batch.

SUMMARY OF THE INVENTION

An object of the present application is to provide systems and methods for manufacturing three-zone, reinforced, continuous, non-laminated, geometrically symmetrical microporous membrane possessing structural integrity.

Another object of the present application is to provide systems and methods for manufacturing reinforced, three-zone continuous, non-laminated symmetrical microporous membrane exhibiting low pressure drop and high flow rate across the membrane.

A further object of the present application is to provide systems and methods for manufacturing reinforced, three-zone continuous, non-laminated, geometrically symmetrical microporous membrane which is particularly suitable for the filtration of biological or parenteral fluids.

Yet a further object of the present application is to provide systems and methods for manufacturing reinforced, three-zone continuous, non-laminated, geometrically symmetrical microporous membrane which is particularly suitable for the filtration of high purity water for the electronics industry.

Yet another object of the present application is to provide systems and methods for manufacturing such a three-zone, continuous, reinforced, non-laminated, geometrically symmetrical microporous membrane.

In accordance with these and further objects, one aspect of the present application includes a system for manufacturing three-zone microporous membrane, the system comprising: at least one vessel for containing a ternary phase inversion polymer mother dope, the dope having been exposed to a mixing temperature which is sufficient to effect dissolution and equilibrium mixing of the polymer, solvent and nonsolvent, the dope contained therein being maintained at a temperature sufficient to stabilize and maintain the mixture after completion of the mixing; at least one pressure means, operatively connected to the at least one vessel, for moving the dope from the at least one vessel to a dope processing site; a dope transportation system, operatively connected to the at least one vessel and the dope processing site, for transfer of dope from the vessel to the dope processing site; at least one thermal manipulation means, operatively connected to the at least one vessel and the dope processing site, for transforming the dope into any one of a plurality of different possible pore size producing dopes; and at least one dope application means operative at the dope processing site and operatively connected to the at least one thermal manipulation means, for applying the dope at the dope processing site such that three-zone microporous membrane is produced.

Another aspect of the present application includes a system for manufacturing three-zone microporous membrane, the system comprising: at least one vessel for containing a ternary phase inversion polymer mother dope, the dope having been exposed to a mixing temperature sufficient to effect dissolution and equilibrium mixing of the polymer, solvent and nonsolvent, the vessel and the dope contained therein being maintained at a temperature sufficient to stabilize and maintain the mixture after cooling from the mixing temperature; a dope transportation system, operatively connected to the at least one vessel and to the dope processing site, for transporting the dope from the vessel to the dope processing site; at least one pressure means, operatively connected to the at least one vessel, for moving the dope from the at least one vessel to a dope processing site; at least three thermal manipulation means, operatively connected to the at least one vessel, the dope transportation system and the dope processing site, for transforming the dope from the at least one vessel to the three thermal manipulation means into any one of a plurality of different possible pore size producing dopes; and at least three dope application means, operatively connected to each of the three thermal manipulation means for application of the dope delivered to the dope processing site such that three-zone microporous membrane is produced.

Still another aspect of the present application includes a three-zone microporous membrane prepared by a process comprising the steps of: providing at least one vessel for containing a ternary phase inversion polymer mother dope; formulating a ternary phase inversion polymer mother dope in the vessel to effect dissolution and equilibrium mixing of the polymer, solvent and nonsolvent; maintaining the mother dope in the vessel at a temperature sufficient to stabilize and maintain the dope formulated after cooling from the formulation temperature; providing a dope processing site having at least one dope application means; operatively connecting the at least one vessel to the dope processing site such that the mother dope is transported from the at least one vessel to the dope processing site; operatively positioning at least one thermal manipulation means between the at least one vessel and the dope processing site; thermally manipulating the mother dope transported from the at least one vessel to the at least one thermal manipulation means into any one of a plurality of different dope possible pore size producing dopes; and applying a predetermined one of the plurality of different possible pore size producing dopes received from the at least one thermal manipulation means to a scrim at the dope processing site to produce reinforced, three-zone microporous membrane.

Other objects and advantages of the invention will be apparent from the following description, the accompanying drawings and the appended claims.

DETAILED DESCRIPTION OF THE PREFERRED EMBODIMENTS

Figure 1:
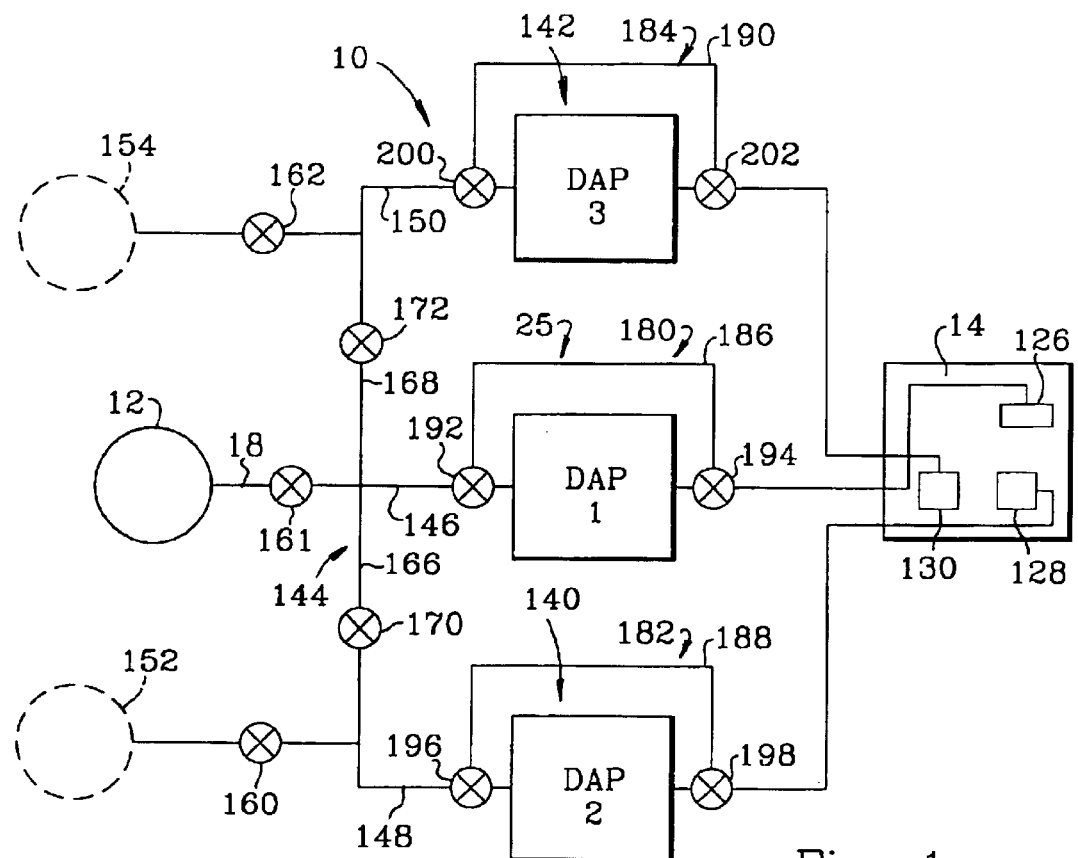
FIG. 1 is a schematic representation of the systems of the present application.

Microporous phase inversion membranes produced using the systems and methods of the present application are preferably produced from nylon. The term "nylon" is intended to embrace film forming polyamide resins including copolymers and terpolymers which include the recurring amino grouping and blends of different polyamide resins. Preferably, the nylon is a hydrolytically stable nylon possessing at least about 0.9 moles of amino end groups per mole of nylon as described in U.S. Pat. No. 5,458,782, the disclosure of which is incorporated herein by reference.

While in general the various nylon or polyamide resins are all copolymers of a diamine and a dicarboxylic acid, or homopolymers of a lactam and an amino acid, they vary widely in crystallinity or solid structure, melting point, and other physical properties. Preferred nylons for use with the methods and systems of this application are copolymers of hexamethylene diamine and adipic acid (nylon 66), copolymers of hexmethylene diamine and sebacic acid (nylon 610), homopolymers of polycaprolactam (nylon 6) and copolymers of tetramethylenediamine and adipic acid (nylon 46). These preferred polyamide resins have a ratio of methylene ($CH_2$) to amide (NHCO) groups within the range of about 4:1 to about 8:1, most preferably about 5:1 to about 7:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, having molecular weights above about 30,000. Polymers free of additives are generally preferred, but the addition of antioxidants, surface active agents, charge modifying agents or similar additives may have benefit under some conditions.

As mentioned in the background of the '295 application, one conventional method for processing dope containing the above mentioned polamide resins into microporous phase inversion membrane is carried out by formulating a specific dope according to a known formula to produce a certain pore size when the dope is cast into microporous phase inversion membrane. The dope comprises a polymer, a solvent and non-solvent in a specific predetermined amount mixed and stored in a sealed storage vessel. Once the dope batch is formulated in accordance with a predetermined formula under controlled conditions including a maximum mixing temperature, the dope is then pumped to a casting line and at that point cast into a microporous phase inversion membrane.

As was indicated in the background of this art in the '295 application, one of the problems discovered was the inconsistency of pore sizes obtained from conventionally formulated dope batches supposedly identically formulated and controlled to a specific maximum temperature and mix history during formulation. However, when some of these out of specification dope batches were reprocessed at a supposedly higher target temperature, there was no noticeable change in the pore size of the phase inversion membrane produced therefrom. Thus, it became evident that once the dope was heated to a certain temperature, the pore size formed in microporous phase inversion membrane produced from that dope could not be changed to a smaller pore size when the dope was reprocessed by reheating to a temperature lower than the temperature to which the dope had already been elevated. In other words, when this phenomenon occurred, the temperature to which the dope had been exposed to during formulation was in fact higher than that to which it was believed the dope had been exposed. This indicated that exacting process control of dope temperature during formulation was important in order to achieve the target specification pore size for the microporous phase inversion membrane.

It was determined in the '295 application that once a dope has been processed at a certain temperature, and that temperature is a temperature higher than the temperature necessary to produce a particular pore size, then the dope retains the memory of having been processed at the higher temperature. Thus, even though the dope had been cooled to room temperature, reheating the dope to a temperature lower than that temperature previously attained during formulation or reheating, any microporous phase inversion membranes produced therefrom would have pores corresponding to the pore size of the highest temperature at which the dope had previously been processed. The smallest possible pore size was a direct result of the thermal history of the specific dope batch. Thus, thermal heat treatment of dope only works in one direction and that is to enlarge the pore size of the resultant membrane, not to decrease pore size of the resultant membrane. Specifically, it has now been determined that there is a "temperature memory" associated with the polymer mixture and that the pore size in any membrane produced therefrom is associated with the highest temperature to which the polymer mixture has been exposed prior to being processed into membrane. This "temperature memory" is permanent as far as a specific temperature is concerned. Thus, once the dope has been exposed to a certain temperature, the dope can never exhibit the properties associated with dope exposed to a temperature below the highest temperature to which it has been exposed but can exhibit the properties associated with dope exposed to a higher temperature if it is exposed to a higher temperature.

The systems and methods disclosed in that Ser. No. 09/022,295 application modified the prior methods and systems described in the background of that application to take advantage of this thermal memory by, presently preferably, formulating at least a single mother dope batch, under tightly controlled conditions, in a vessel at a low temperature, typically about twenty-one degrees (21°) C. to about thirty-four (34°) C. and, presently preferably, at the maximum non-solvent to solvent ratio possible, at the specific formulation weight percentage of the polymer, it being understood that the mother dope batch is formulated at a temperature below the temperature normally associated with the formation of the smallest desired pore size to be produced in a reinforced, three-zone microporous membrane from that particular mother dope batch formulation.

As described in that application, only a relatively small portion of the mother dope batch contained within the vessel was transported via a pump, preferably a metering pump, from the vessel to a, presently preferably, thermal manipulation mechanism or means including a first heating zone for elevating the temperature of that relatively small portion of the dope. Then, the smaller portion of the dope was pumped to a second heating zone of the thermal manipulation mechanism or means, for incrementally elevating the temperature of the dope to a target temperature. The thermally manipulated dope was then transported to a cooling zone where the dope was cooled to a temperature and a viscosity sufficient for processing at the dope processing site into at least one zone of a reinforced, three-zone microporous phase inversion membrane, it being understood that the viscosity of the cooled dope, already thermally manipulated to produce a specific pore size, may be independently manipulated by controlling the cooling temperature in order to optimize the viscosity of the dope at the reinforced, three-zone membrane manufacturing apparatus.

The, presently preferred, mother dope for producing the widest range of possible pore sizes from the smallest to the largest pore size was formulated to provide a dope with the maximum non-solvent to solvent ratio attainable at the specific formulation weight percentage of the polymer. It was understood that the ratio of non-solvent to solvent could be less than the maximum and still produce a range of pore sizes but not necessarily provide the maximum flexibility to produce phase inversion membrane having the widest possible range of pore sizes.

Once the relatively small portion of the mother dope batch had been pumped from the vessel to a first thermal manipulation mechanism or means heating zone, the temperature of the small portion of the dope in the first heating zone was, presently preferably, elevated to within about two degrees (2°) C. below a predetermined target temperature. The predetermined target temperature can be any of a plurality of possible target temperatures at which the dope has been determined to yield a particular microporous phase inversion membrane pore size when processed into microporous phase inversion membrane. The temperature of the dope within that first heating zone was then elevated to within about ±0.5° C. of about 2° C. below the target temperature by using temperature control apparatus, as will be explained below. Thus, the highest temperature that the small portion of the dope was exposed to during the movement of the dope through the first heating zone of the first thermal manipulation mechanism or means was, presently preferably, about 1.5° C. below each specific predetermined target temperature.

After achieving the desired temperature of about 2° C. below the specific target temperature in the first heating zone, the relatively small amount of dope was further processed through the second heating zone wherein the temperature of the dope was further elevated and controlled to within about ±0.15° C. of the one specific target temperature. Upon achieving a dope temperature of about ±0.15° C. of one specific target temperature, the dope exited the second heating zone of the thermal manipulation mechanism or means and was, presently preferably, cooled in a cooling zone of the thermal manipulation mechanism or means to a temperature, presently preferably, about twenty-one degrees (21°) C., or other temperature that provides the dope with an appropriate viscosity for appropriate application and, after sampling and testing, was further pumped to a microporous phase inversion membrane production facility or dope processing site for processing into microporous phase inversion membrane having the predetermined pore size corresponding to the target temperature.

It is an important advantage of the systems and methods of the present application that the dope be thermally manipulated to a precise predetermined temperature that produces a specific pore size in microporous phase inversion membrane and was then cooled back down to a temperature which independently controls the viscosity of the dope during the casting process, all within about ten (10) minutes, considerably less time than any known process has previously controlled the temperature elevation phase alone during, such as, reprocessing an out of specification dope.

As described in the prior application, after exiting the dope cooling zone, a valve located in the dope process line provides for the withdrawal of dope samples from the line for testing to ensure that the dope will produce microporous phase inversion membrane having the specific pore size desired. Additionally, the valve also provides for the recirculation of the dope after the dope exits the cooling zone and returns the dope to the dope process line at a point prior to the first heating zone or other location, as appropriate.

Another important advantage of thermally manipulating dope includes the surprising ability to produce, from a single mother dope, phase inversion membrane having a range of pore sizes greater than previously produced, from about 0.05 microns or smaller to about 50 microns or larger, an order of magnitude of about three (3). By using this method, microporous membrane production can be accomplished in any sequence as long as the desired pore size is not one that requires an initial formulation mixing temperature less than the formulation mixing temperature of the mother dope.

The methods and systems of the above described systems and methods for thermally manipulating the pore size in dopes use real time essentially instantaneous, about ten (10) minutes or less and no more than about five (5) to about (20) twenty minutes for the total thermal manipulation cycle as opposed to three to five hours for the prior art thermal manipulation to independently control dope viscosity and resulting phase inversion membrane pore size in the production of phase inversion membrane. The systems and the methods of the present application are designed to exploit, to the maximum advantage, the permanent thermal memory of the phase inversion membrane casting dopes.

As described in the prior application, thermal manipulations occur between the inlet to the first heat exchanger and the outlet of the final cooling mechanism or means or heat exchanger. When the '295 application was filed, volume of about five gallons of the dope was being processed through the thermal manipulation mechanism or means (heat exchangers) at any one time between those two points at a speed of about one-half (0.5) to about three-quarters (0.75) of a gallon per minute (GPM). At a process speed of about one half gallon per minute, the about five (5) gallons of dope are thermally manipulated in about ten (10) minutes or less to a point where the dope was ready for coating at a coating apparatus. When providing dope from a single mother dope vessel through only one thermal manipulation mechanism or means (see FIG. 3) and with the particular apparatus used at that time, these amounts and rates were found to be appropriate. However, when using two or three thermal manipulation mechanisms or means to provide dope from a single mother dope vessel to two or three coating mechanisms, about 2 gallons of the dope is now being processed through each thermal manipulation mechanism at any one time between the inlet to the thermal manipulation mechanism and the outlet of the final cooling mechanism at a speed of about 0.3 for about 0.9 gallons per minute per each Dial-A-Por™ unit branch for a total of about 1.0 gallon per minute when all three Dial-A-Por™ unit are in operation (see FIG. 1). At the process speed of about one gallon per minute, then about 2 gallons of dope in each Dial-A-Por™ unit is thermally manipulated in about ten (10) minutes or less to the point where the dope is ready for coating at the coating apparatus.

The temperature manipulation of the systems and methods of the present application is accomplished by precisely controlling the temperature of the dope as the dope is pumped through each of the heat exchangers to a very precise point over a large surface area or heat transfer area within the first and third heat exchangers so that essentially each element of the fluid sees essentially the same temperature manipulation. In the second heat exchanger, the static mixer/heat exchanger continuously pushes fluid, such as dope, from the center of the heat exchanger to the wall than back to the center again, substantially eliminating thermal gradients and boosting the inside film coefficient to essentially convert laminar flow to turbulent flow to enhance mixing.

An illustrative system utilized for preparing, moving or pumping and controlling the temperature of a mother dope batch to a predetermined target temperature to produce at least one predetermined pore size in a reinforced three-zone microporous phase inversion membrane in accordance with the system and methods are described below. Referring now particularly to the accompanying drawings, FIG. 1 is a schematic representation of one representative system 10 for implementing the methods of the present application. As shown, the system 10 includes a plurality of processing stations and processing mechanisms beginning with the mother batch of dope contained in the storage vessel 12, presently preferably, under about forty-five (45) psi pressure, and ending with the dope being processed at a dope processing site 14 into reinforced, three-zone microporous phase inversion membrane 101 (see FIG. 7).

The systems and methods of the present application begin with the preparation of a mother dope, as described in the Ser. No. 09/022,295 application. The dope is then transported to at least one thermal manipulation mechanism or means, or Dial-A-Por™ unit and preferably at least two Dial-A-Por™ units where the dope is incrementally thermally manipulated to provide a dope that, when delivered to and coated on a scrim through dope application mechanism or means at the dope processing site, as described in the Ser. No. 09/040,979 and the Ser. No. 09/040,816 applications, yields a specific pore size in the appropriate zone of a reinforced, three-zone microporous membrane. While the only one Dial-A-Por™ unit is described in detail below, it is understood the other two Dial-A-Por™ units depicted in FIG. 1 are similarly constructed.

As mentioned above, the membrane production process begins by formulating a mother batch of dope by mixing various constituents known in the art in a conventional dope storage vessel 12. Dope preparation is similar to the dope preparation discussed in U.S. Pat. No. 4,645,602, issued on Feb. 24, 1987, assigned to the assignee of the present application, the disclosure of which is incorporated herein by reference. The sealed storage vessel 12 is typically maintained in an inert nitrogen atmosphere from about zero (0) to about fifty (50) psig. Presently, the vessel is preferably pressurized to approximately forty-five (45) psig with nitrogen.

Figure 3:
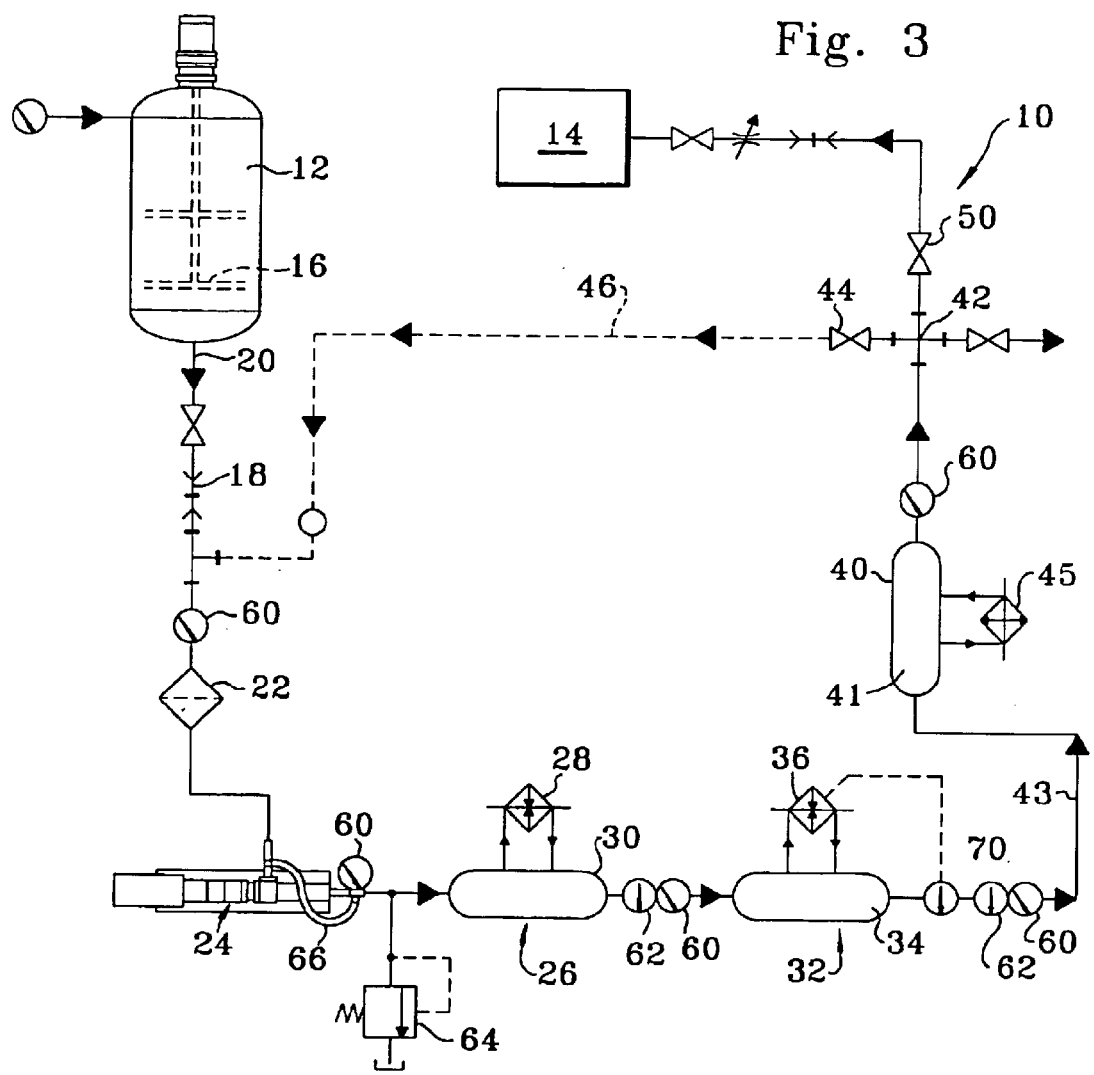
FIG. 3 is a schematic of one representative Dial-A-Por™ apparatus that could be incorporated into the system of FIGS. 1, and 8–10 for carrying out the methods of present application.

The storage vessel 12 includes conventional temperature control mechanism or means, such as, for example, a water or liquid jacket surrounding the dope and conventional fluid mixing mechanism or means 16 such as a rotating device for agitating the dope inside the storage vessel 12 (see FIG. 3). Fluid transport mechanism or means 18, such as, for example, conventional pipe or hose, are operatively connected to the bottom 20 of the vessel 12 for sequentially transporting a small portion of the dope, after stabilizing the formulation, initially at a temperature of about twenty-one degrees (21°) C. to about twenty-eight (28°) C. (or any suitable initial processing temperature for the dope) contained in the vessel to a coating apparatus.

As illustrated in FIG. 3, a, presently preferably, 150 micron filter 22 for separating foreign matter, solid contaminants and any suspended particulate solid particles from the dope is operatively positioned in the hose. One filter 22 found to be useful in performing this function is, presently preferably, a CTG-KLEAN filter housing manufactured by CUNO as Part No. 1WTSR1 with a 150 micron cartridge installed.

Figure 5:
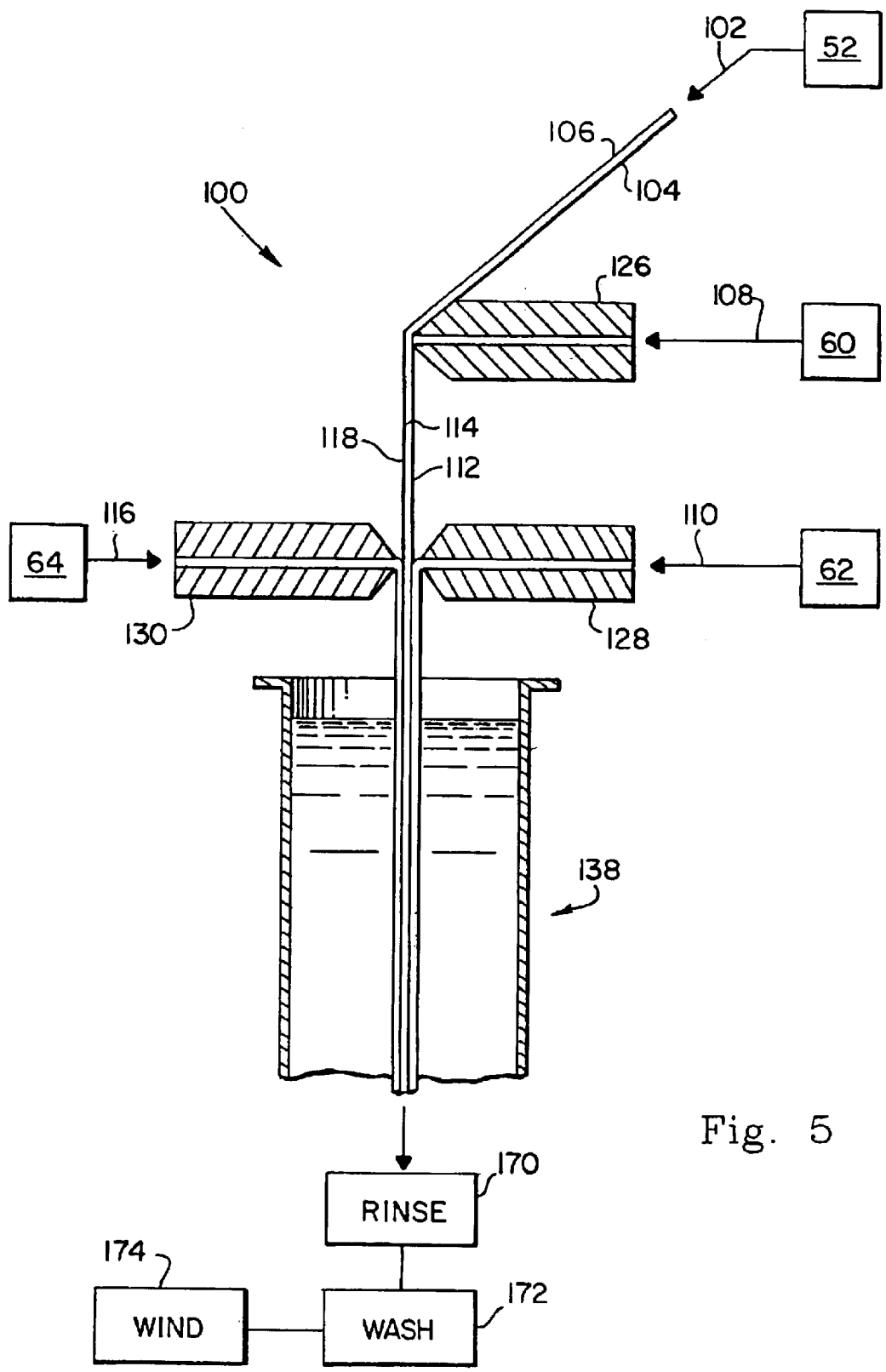
FIG. 5 is a schematic representation of a specific dope processing site useful with the systems and methods of the present application.

As illustrated in FIG. 5, the scrim 102 is fed by the conventional drive section, downwardly between, presently preferably, a series of dies, including the first die 126 for, presently preferably, completely pressure impregnating the scrim 102 with a first dope 108 and second 128 and third 130 dies for coating a second 110 and a third 116 dope on to the outer surfaces 112, 118 of the dope impregnated scrim 114. In one apparatus useful to produce reinforced, three-zone microporous membrane, the first die 126 is a single slot die, operatively connected to a suitable reservoir 60 containing the first dope 108 or, presently preferably metering pump 402 (see FIG. 8) for delivering the first dope 108 to the die 126 at the appropriate pressure. The first dope may vary depending on the type of film-forming polymer used, but is generally a liquid dope formulated and treated to produce a specific pore size when quenched. A conventional controlled pumping mechanism or metering pump 402 (schematically shown) operates to selectively deliver the first dope 108 from the reservoir 60 or from the Dial-A-Por™ unit 25 to the first die 126. The first die 126 has an opening configured to provide an even amount of the first dope 108 so as to pressure impregnate the scrim 102 as the scrim 102 passes by the opening of the first die 126. When different sizes of scrim 102 are used, the die 126 may be changed for appropriate scrim impregnation. It is important that the first dope 108 transferred to the scrim 102 substantially completely saturate or impregnate the scrim, as was discussed above.

Figure 2:
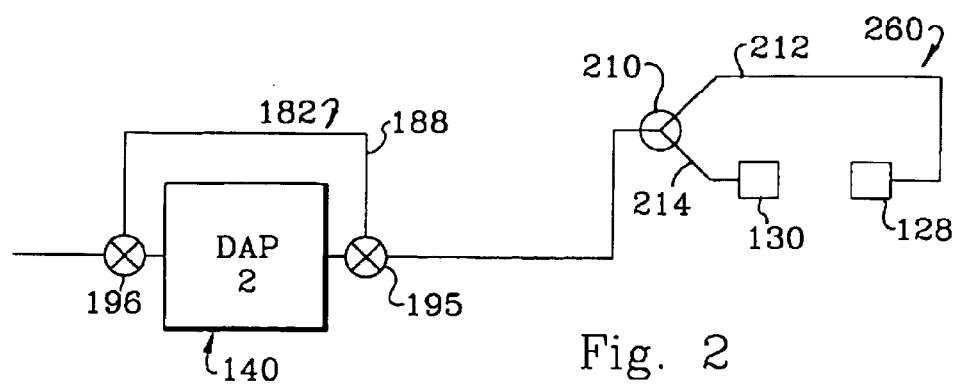
FIG. 2 is a schematic representation of one Dial-A-Por™ apparatus modified to supply dope to two separate dope application mechanism or means at the dope processing site.
Figure 8:
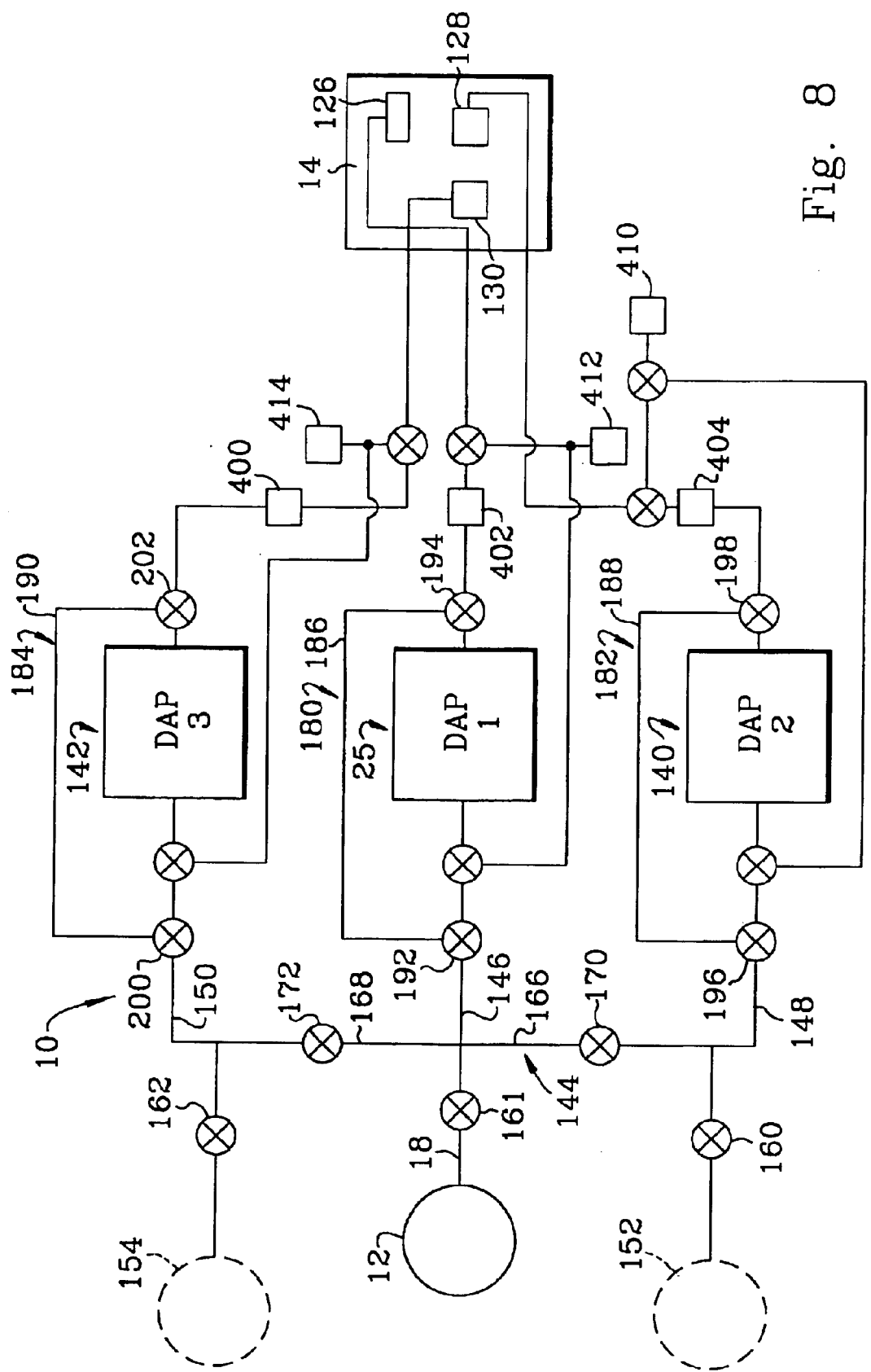
FIG. 8 is a schematic representation of an alternative system of the present application.

After the scrim 102 is at least substantially impregnated or saturated with the first dope, the scrim travels between the second 126 and third 130 dies. In one embodiment of the apparatus, the scrim 102 is disposed vertically and travels in the downward direction. In one, presently preferred embodiment of the apparatus, the scrim 102 may initially travel at an angle less than vertical, as illustrated in FIG. 2. Second 126 and third 130 dies are essentially disposed on opposite sides of the scrim 102 in order to produce the membrane of the present invention. Second die 128 is directed to coat the polymer dope 110 desired onto the first surface 112 of the substantially saturated scrim 102 and in like manner, third die 130 is directed to coat the polymer dope 116 desired onto the second surface 118 of the substantially saturated scrim 102. Each die 128, 130, is fed from a reservoirs 62, 64 having the dopes 110, 116 or from a metering pump 400, 404, as illustrated in FIG. 8. It is to be appreciated that the dopes may be a combination of any of the well-known film-forming polymers in an appropriate well-known solvent. Controlled pumping mechanisms or metering pumps 400, 404 selectively deliver the dope 110, 116 to the dies 128, 130.

Figure 7:
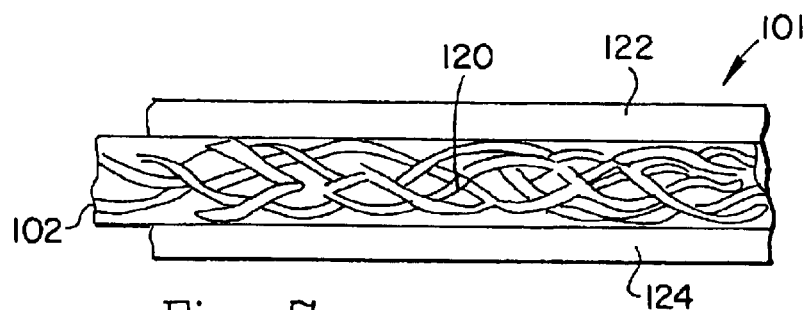
FIG. 7 is a cross-section schematic of a representative reinforced, three-zone, microporous membrane produced by the systems and methods of the present application.

As best shown in FIGS. 5 and 7, the dies 128, 130 are each disposed on opposite sides of the pressure impregnated scrim 102 and essentially opposed to the other die. Each die 128, 130 has a chamber 272 for receiving the dope solution and a narrow slot 274, transversely extending across each side of the front 275 of each die, for first transferring the dope solution onto the impregnated scrim 102 (via die 126) and then to coat the substantially saturated scrim on both sides 112, 118 (via dies 128, 130). The dope is forced out of the slots 274 in each die by the pressure supplied by the metering pumps (not shown), in a manner known in the art.

Figure 6:
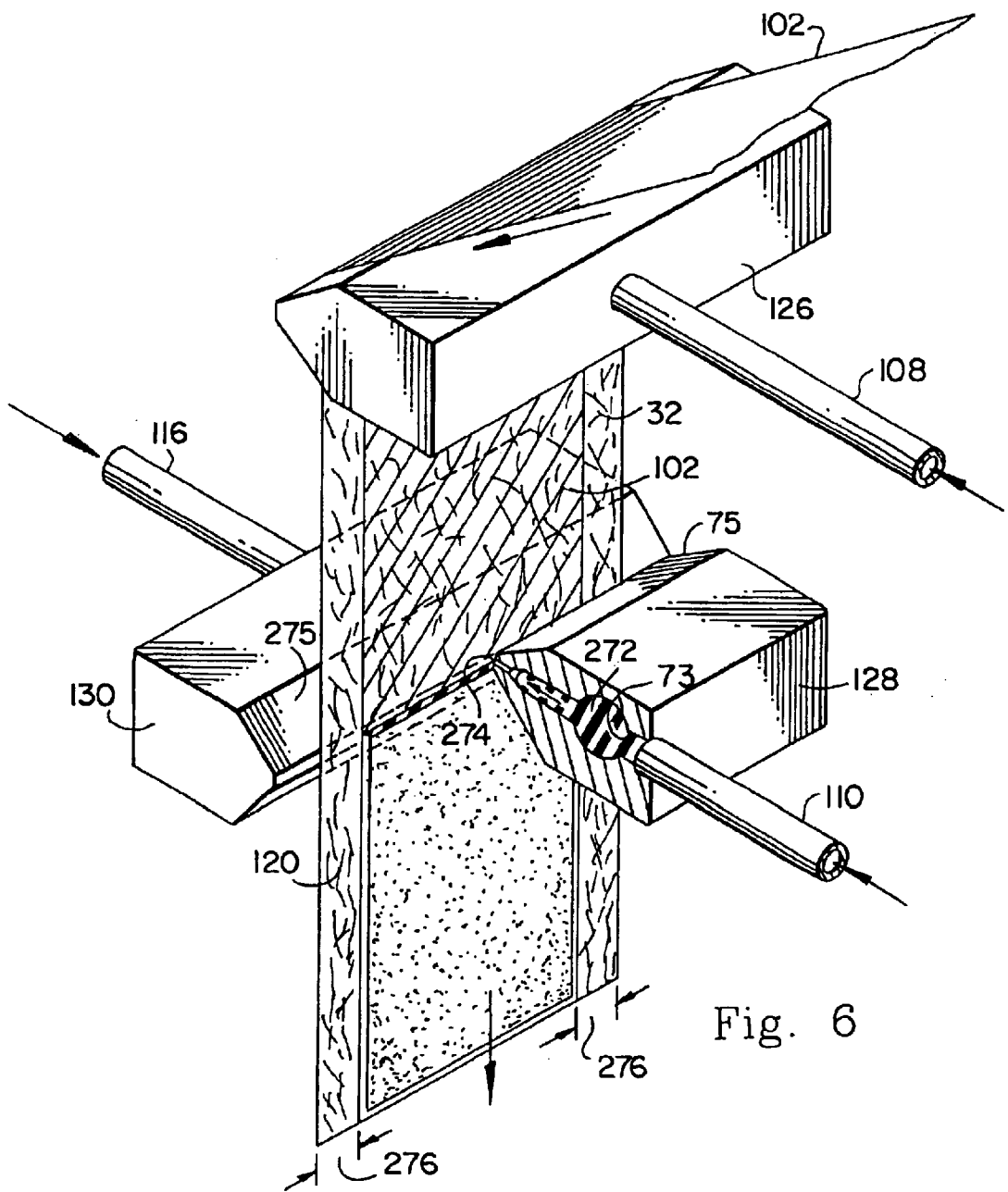
FIG. 6 is a detailed, enlarged perspective view of a scrim positioned between the opposed dies of FIG. 5, with a portion of one die partially broken away.

The pressure provided to the dope varies with each dope and scrim used. Determination of the appropriate pressure for any of the dopes applied to a particular scrim can be determined by those skilled in the art. The dies 128, 130 are positioned close enough to the substantially saturated, impregnated scrim 102 so that the dope directly contacts the outer surface of the dope saturated scrim 102 when the dope is forced from the slot 274. As is apparent in FIG. 6, the length of the slot 274 determines the final width of the dope coated onto the saturated scrim. By masking or other appropriate means, it is possible to foreclose coating the dope at the edges of scrim 102, leaving a selvage area 276 for trimming, potting or other post-formation operations.

It is to be understood that the initial dope may be different from the other dope(s) and that it is possible to have three different dopes, with a first dope impregnating the scrim 102 and the second and third dopes coated on each side of the first dope impregnated scrim, resulting in a graded density three-zone membrane.

Figure 9:
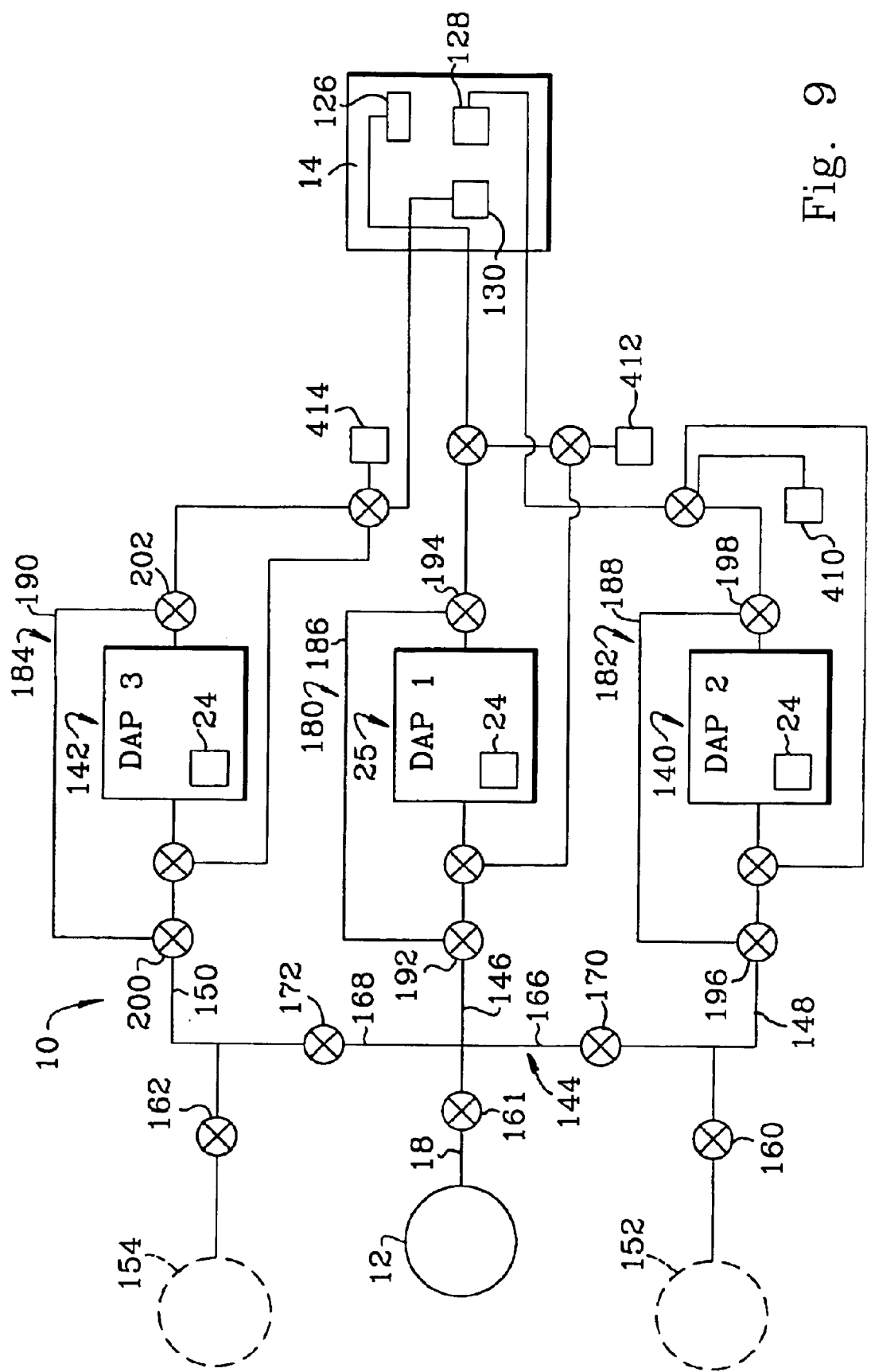
FIG. 9 is a schematic representation of another alternative system of the present application.

In one specific embodiment, further downstream from the vessel 12 is a metering pump 24, similar to that of FIGS. 3 and 9, for incrementally transporting a relatively small portion of the dope contained in the vessel 12 from the vessel to the dope processing site 14. One pump found to be useful for this function is a type 1 rotating gear pump manufactured by Roper Pumps, model number 005SSIPT4DJMCW, delivering about 0.03 to about 0.5 gallon per minute.

Figure 4:
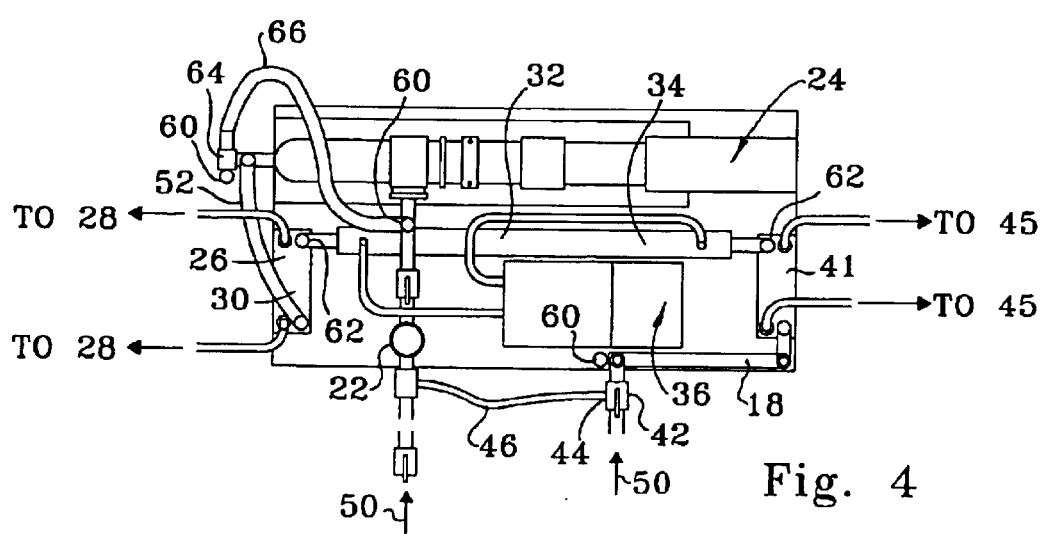
FIG. 4 is a plan view of a representative configuration for the thermal manipulation mechanism or means, including the pump, the heating mechanism or means and the cooling mechanism or means previously used as a stand alone unit portions of which are useful with the systems of the present application for carrying out the methods of the present application.

As illustrated in FIG. 3, downstream from the pump 24 and operatively connected thereto is a first thermal manipulation means or Dial-A-Por™ unit 25 (See FIG. 1) which includes a first mechanism or means or first heating means 26, for elevating or increasing the temperature of the small portion of the dope to within, presently preferably, about two degrees (2.0°) C. below a predetermined temperature. As illustrated in FIGS. 3 and 4, the first heating means 26 includes a temperature controller 28, (shown schematically in FIG. 3). One specific model temperature controller found useful for this function is a Conair Water Temperature Controller having about a ±0.2° C. accuracy using an external resistant temperature devise (RTD) probe (Thermalator Temptrac Series, model number TTP1-D1 with direct injection utilizing a motorized modulator valve and an Aethena Series XT16 and dual output controller). The temperature controller 28 is operatively connected to a plate heat exchanger 30, presently preferably, having about a twenty (20) square foot heat transfer area or any area sufficient to accomplish the temperature elevation of the dope to about two degrees (2.0°) C. below a predetermined target temperature. Such a plate heat exchanger 30 is available from Tranter, as Model No. MX-20-0412-UP-080/0.060. Preferably, the controller 28 is configured to measure the process fluid (water) in the opposite direction of dope flow (counter current).

As illustrated in FIG. 3, after exiting the first heating means 26, the dope is, presently preferably, transferred to a second mechanism or means or second heating means 32 for further increasing or elevating the temperature of the dope. The second means 32, presently preferably, consists of a jacketed pilot mixer/heat exchanger 34 such as, for example, those available from Chemineer as a Kenics HX-½ Jacketed pilot mixer/heat exchanger, Part No. 033-00128. The temperature of the mixer/heat exchanger 34 is, presently preferably, controlled by a heated circulating water bath programmable controller 36 having a temperature control capability of about ±0.01° C. with a display having an accuracy of only about ±0.2° C. One programmable controller found useful to perform this function was a Haake (USA) model number N8-B7, 3 KW heating circulator, with the dope temperature being controlled by an external resistance temperature device (RTD/PT100) 70. Preferably, the controller 36 is configured to measure the process fluid (water) in the opposite direction of dope flow (counter current).

After the dope has been processed through the second heating means 32 and after the dope temperature has been elevated to about ±0.15° C. of the target temperature, the dope is then cooled in a cooling mechanism or means 40. The cooling means 40 includes a heat exchanger 41 and a controller 45. The cooling means 40, is used to reduce the temperature of the relatively small amount of dope exiting the second heating means 32 at the target temperature to the ambient coating temperature of about twenty one degrees (21°) C., or other temperature which provides an appropriate dope viscosity, while the dope is being processed through a heat exchanger 41 having about a 20 sq. ft. heat transfer area. One heat exchanger found to be acceptable to perform the heat exchanger function is a Tranter, Model No. MX-20-0412-UP-080/0.060 heat exchanger. Apparatus found useful to perform the control function is a Thermal Care Accuchiller Model NO. AQOAO3 air cooled portable chiller having a temperature control accuracy of about ±1° C. Preferably, the controller 45 is configured to measure the process fluid (water) in the opposite direction of dope flow (counter current).

After the dope is cooled in the cooling means 40, the dope is pumped to a valve 42 (in FIG. 3) operatively positioned in the dope process loop 46 where samples of the dope exiting the cooling means 40 to can be drawn and tests can be run thereon to determine the pore size that the dope will produce in microporous membrane after coating. Another position 44 for the valve 42 provides for dope recirculation within the dope process line to a position between the storage vessel 12 and the metering pump 24 or other appropriate location.

When the valve 42 is in the recirculation position 44, a recirculation loop 46 can be actuated, which enables the system to reach a steady state temperature prior to the membrane coating being commenced at the dope processing site 14. Additionally, running in the recirculation loop 46 prevents the production of out-of-specification microporous phase inversion membrane until after receiving the test results from the samples taken of the dope exiting the cooling means 40. Once it is determined that the dope has, in fact, been stabilized at the appropriate predetermined target temperature for producing the appropriate pore size in microporous membrane, then the valve 42 can be moved to position 50 to deliver the dope to the dope processing site 14.

Additional components of the dope processing system 310 include pressure gauges 60 positioned at various locations as illustrated in FIG. 3. The pressure gauges positioned on either side of the pump 24 obtain the differential pressure across the pump and the head pressure to the pump. Additional pressure gauges are operatively positioned downstream from each heat exchanger means, 26, 32, and 40 to monitor the pressure drop after the dope has processed through each heat exchanger means for undesirable pressure build up.

Omega thermistors 62 having a precision of about ±0.15° C. are operatively positioned on the downstream sides of the first 26 and the second 32 heat exchanger means for providing a more accurate temperature reading of the downstream process than the Conair or the Haake units displays are capable of providing. The thermistors 62 provide the capability to read the temperature to an accuracy of about ±0.15° C. for increased temperature control whereas the Haake unit is capable of controlling the temperature accuracy to ±0.01° C. One additional feature in the system of the present application includes a pressure relief valve 64 operatively positioned in the loop 46 for protecting the system from damage from excess pressure buildup by taking the pump out of operation should the pressure exceed a predetermined pressure, presently about 250 psi. If the pressure were to exceed a certain pressure, then the dope would be recirculated through the pump via hose 66 (see FIG. 4).

An RTD 70 is operatively positioned in the loop and connected to the Haake recirculation bath 36 for controlling the temperature of the dope in the second heat exchanger means 32. Another RTD probe (not shown) is located inside the Haake recirculation bath 36. In operation, the external RTD probe 70 is the controlling loop unless the probe indicates that the temperature of the dope is outside the maximum setpoint differential, control reverts to the internal RTD probe for controlling the process to the setpoint. The Haake is a proportional band controller utilizing Fuzzy Logic PID having the two above described RTDs, one internal and one external to minimize the temperature differential between the dope and the process fluid.

It is now possible to combine the first 26 and second 32 heating means of each Dial-A-Por™ into a single heating means, so that the resulting temperature coming out of the single heating means could be controlled to within at least about ±0.2° C. of the target temperature. The previously described Conair unit is capable of such control.

The Dial-A-Por™ units 25, 140, 142 are, in their presently preferred embodiment, two stage units which use the high temperature memory of a dope to control pore size, and the cooling cycle to independently control the viscosity of the dope at a coating apparatus. In this manner, the thermal manipulation of the dope alone is sufficient to produce a wide range of commercially useful phase inversion membranes from a single starting dope.

As schematically illustrated in FIG. 5, one, presently preferred, dope processing site 14 or vertical casting line (VCL) apparatus 100 and method for manufacturing a reinforced, three-zone continuous, geometrically symmetrical microporous filtration membrane 101 (see FIG. 7) includes: providing a porous support material 102 having first 104 and second 106 sides, presently preferably, pressure impregnating the support material 102 with a first solution or dope 108 processed to a first temperature, coating a second solution or dope 110 processed to a second temperature over the first side 112 of the pressure impregnated support material 114, coating a third solution or dope 116 processed to the second temperature or to a third temperature over the second side 118 of the pressure impregnated support material 114 such that a continuous microporous membrane having a middle zone 120 disposed between an upper zone 122 and a lower zone 124 (See FIG. 7) formed from the first 108, second 110 and third 116 dopes, the support material 102 being, presently preferably, completely embedded within the middle zone 120 and the middle zone having a pore size at least about twenty percent (20%) greater than the pore size of at least one of the upper zone 122 and the lower zone 124.

The novel arrangement of slot dies 126, 128, 130 to, presently preferably, first pressure impregnate the support material 102 with a first dope 108 and then to coat both sides thereof with other dopes has been found particularly effective to produce the membrane 101. As specifically shown in FIG. 5, one of the presently preferred apparatus 100 for manufacturing the membrane 101 at the dope processing site 14, in accordance with the systems and methods of the present application, includes a first die 126 for pressure impregnating the support material or scrim 102 and substantially opposed second and third dies 128, 130 for substantially simultaneously coating both sides 112, 118 of the initially impregnated scrim 102 or other apparatus capable of coating the impregnated scrim as described above.

The three-zone microporous membrane 101 produced by the system and methods of the present application is generally produced by first pressure impregnating the scrim with a first dope and then coating any one of a plurality of possible different dopes containing a film-forming polymer in a solvent system onto each side of the dope impregnated scrim and immediately quenching the dopes 108, 110, 116 in a bath 138 comprised of a conventional nonsolvent system for the polymer. It is presently believed that an important parameter responsible for development of micropores in the membrane (e.g. pore size) is the solvent system employed with the polymer and the nonsolvent system used in quenching the polymer film as well as the phenomena discussed in the previously mentioned patent application. The selection of the solvent for the polymer is determined by the nature of the polymer material used and can be empirically determined on the basis of solubility parameters, as is well known and conventional in the art.

As illustrated in FIG. 1, one, presently preferred, system 10 for manufacturing reinforced, three-zone microporous membrane includes at least one vessel 12, presently preferably, containing a mother dope operatively connected to at least three Dial-A-Por™ dope thermal manipulation units 25, 140, 142 with each of the Dial-A-Por™ units being connected respectively to the first 126, second 128 and third 130 slot dies. As illustrated, the system 10, presently preferably, includes a single mother dope vessel 12 from which the dope can be pumped or moved by pressure on the dope in the vessel to a dope transporting mechanism or means piping system 144 having at least three branches 146, 148, 150, each branch being operatively connected to each of the three slot dies, respectively or be pumped, as illustrated in FIG. 3. Operatively positioned between each of the dies and the mother dope vessel are the three separate Dial-A-Por™ units 25, 140, 142. Each Dial-A-Por™ unit is capable of thermally manipulating a portion of the dope from the mother dope batch to a specific predetermined temperature which produces a predetermined pore size and then delivering that thermally manipulated dope to the slot die operatively connected thereto, as described above.

Alternatively, additional dope containing vessels 152, 154 can also be operatively directly connected to each of the three Dial-A-Por™ units. Each of these vessels may contain a specific mother dope as described earlier in the application or it may contain a specific dope formulated to produce a specific pore size or a dope made of a different polymer.

Specifically, as illustrated in FIG. 1, one dope containing vessel 12 is operatively connected to the dope transporting system and to the first Dial-A-Por™ unit 25, a second dope containing vessel 152 is operatively directly connected to the dope transporting branch system 148 and to the second Dial-A-Por™ unit 140 and a third dope containing vessel is 154 is operatively directly connected to the dope transporting system branch 150 and to the third Dial-A-Por™ unit 142. Liquid flow control mechanisms or means or valves 160, 161, 162 are operatively positioned between the dope transporting system 144 and the first dope containing vessel 12, the second dope containing vessel 152 and the third dope containing vessel 154, respectively, so that the flow of dope from each dope containing vessels, 12, 152, 154 to each of the Dial-A-Por™ unit 25, 140, 142 from the respective vessels 12, 152, 154 can be selectively controlled.

One of the dope containing vessels 12 is, presently preferably, connected directly to the dope transporting system 144 via valve 161 for the first Dial-A-Por™ unit 25 and this particular dope transporting system 146 is also interconnected by pipes, 166, 168 to both of the other two Dial-A-Por™ transporting system branches 148, 150. Valves 170, 172 are operatively positioned in the interconnected dope transporting system branches 166, 168 so as to selectively control the flow of dope from the center mother dope vessel 12 to either of the second Dial-A-Por™ 140 or third Dial-A-Por™ 142 units. Further, dope bypass mechanisms or means 180, 182, 184 including, such as, for example, pipes 186, 188, 190 and valves 192, 194, 196, 198, 200, 202 are operatively connected to the dope transportation system branches 146, 148, 150 before and after each Dial-A-Por™ unit 25, 140, 142 so that the dope flowing therein can be diverted around each Dial-A-Por™ unit to flow directly to a selected slot die 126, 128, 140 without being processed through any one of the Dial-A-Por™ units. The valves 192, 194, 196, 198, 200, 182 are, presently preferred, positioned in the intersection of the dope transportation means 146, 148, 150 and the dope bypass means, 180, 182, 184 before and after each Dial-A-Por™ unit 25, 140, 142 operatively positioned in the dope transporting means 144.

In one preferred system and method, a single dope vessel 12 is operatively connected to the three Dial-A-Por™ units 25, 140, 142. In operation, the dope vessel 12 is filled with a mother dope as described above, and the dope is then simultaneously moved by a pump integral with each Dial-A-Por™, as illustrated in FIG. 3, or pressure on the dope contained in the vessel 12 through the dope transporting mechanism or means 144 to the first Dial-A-Por™ 25, the second Dial-A-Por™ 140 and the third Dial-A-Por™ 144 unit, respectively. In each of the Dial-A-Por™ units 25, 140, 142, the dope is selectively thermally manipulated to a predetermined temperature corresponding to a desired pore size and is then transported to the respective predetermined slot die according to the predetermined pore size desired to be produced in a reinforced, three-zone microporous membrane after being applied/coated by the respective slot die 126, 128, 130. Each Dial-A-Por™ unit 25, 140, 142 may thermally manipulate the dope processed therethrough to three different temperatures producing three different pore sizes.

Additionally, two of the three Dial-A-Por™ units may thermally manipulate the dope to the same temperature to produce the same pore size in two of the zones of the three-zone membrane.

Alternatively, any combination of one, two or three dope vessels 12, 152, 154 could be utilized to provide a mother dope from each vessel to each respective Dial-A-Por™ units where each respective dope would undergo thermal manipulation to produce a dope that would provide a specific predetermined pore size to each of the respective slot dies.

In another system and method, at least one, and as many as all three of the dope vessels could contain dope formulated to produce a specific pore size, such dope being transported to the respective slot die, but bypassing each of the respective Dial-A-Por™ units.

In still another preferred system and method, any two of the Dial-A-Por™ units could be bypassed by receiving dope directly from vessels containing dope formulated to produce a specific pore size for delivery to two of the slot dies, with the third slot die receiving dope from a vessel containing a mother dope, processed through one of the Dial-A-Por™ units to deliver dope for providing any one of the plurality of predetermined pore sizes at the third slot die.

In still another preferred system and method of the present application, pore size specific preformulated dope could be delivered to one slot die by bypassing the Dial-A-Por™ unit, and dope from a single mother batch dope in one vessel could be processed through the other two Dial-A-Por™ units to deliver specific pore size producing dope to the other two slot dies.

As illustrated in FIG. 2, in yet another possible configuration of the systems and methods of the present application, one vessel could provide a mother dope to one Dial-A-Por™ unit 140 for thermal manipulation to a specific temperature to produce a specific pore size then deliver the so manipulated dope to two slot dies 128, 130 by providing a system 260 including a split transportation means 210 having branches 212, 214, connected to slot dies 128, 130, respectively.

As can be seen, the permutations and combinations of the systems and methods for producing the reinforced, three-zone microporous membrane in accordance with the systems and methods of the present application are quite numerous.

As illustrated in FIG. 5, in order to manufacture the three-zone microporous membrane, the support material 102 having first 104 and second 106 sides is impregnated with the first dope 108 from the appropriate dope source by any of a variety of techniques, e.g., roll coating, spray coating, slot die coating, and the like, with slot die pressure impregnating being presently preferred, to substantially completely impregnate the support material 102 with the first dope 108. As used in this disclosure, "complete impregnation of the support material" means that all fibers of the support material are completely surrounded by liquid dope and that no portion of the support material is not covered by liquid dope and that no portion of the support material protrudes from the center zone into either the second or third zones in the finished three-zone membrane.

The specifics of the production of the reinforced, three-zone microporous membrane is discussed in detail in the '816 and the '797 applications and further discussion here is believed to be unnecessary.

In accordance with one preferred embodiment, the second 110 and third 116 dopes (see FIG. 5) provided from appropriate dope sources, including the same mother dope source, produce substantially identical pore sizes but produce a different pore size than the first dope 108, provided from the appropriate source, including the same mother dope source of the second and third dopes. In accordance with another preferred embodiment, the second 110 and third 116 dopes provided from appropriate dope source, including the same mother dope source, produce a different pore size as well as each producing a different pore size from the first dope 108 provided from an appropriate dope source, including the same mother dope source. It is possible to have any pore size from the largest to the smallest in any of the three zones and in any order.

In one presently preferred embodiment, the middle zone 120 (as illustrated in FIG. 7) of the microporous membrane 101 should have an average pore size which is at least about twenty percent (20%) greater, preferably at least about fifty percent (50%) greater, more preferably at least about 100% greater, and most preferably at least about 120% greater, than the average pore size of at least one of the upper zone 122 and lower zone 124 of the membrane and preferably both the upper and lower zones. The pores formed in the middle zone 120 have an average size of about ten (10) microns or less and the average pore size will preferably range from about 0.5 microns to about two (2) microns, more preferably from about 0.1 to about one (1.0) microns. The middle zone 120 has a pore size distribution which is preferably quite narrow in range, although this is not essential for satisfactory performance.

The middle zone 120 should be as thin as possible so long as it provides sufficient structural strength and embeds the support material 102 such that, presently preferably, no fibers of the support material protrude from the middle zone 120 into either the upper 122 or the lower 124 zone. However, in one presently preferred embodiment, some strands/fibers of the support material 102 are contiguous with or slightly protrude into at least the one of the other two zone 122, 124 formed from a tight dope or coating solution or into both zones 122, 124 when both zones are formed from a tight dope. Most preferably, some strands/fibers of the support material 102 are contiguous with or slightly protrude into the other two zone 122, 124.

It is believed that having a relatively thin middle zone in which at least some of the scrim is not completely encapsulated within the middle zone may be advantageous in that the thickness of the middle zone will be kept to a minimum, thus, resulting in a thinner overall finished membrane.

The thickness of the middle zone will typically range from about fifty (50) microns to about one hundred fifty (150) microns and preferably from about seventy-five (75) microns to about one hundred (100) microns or whatever dope volume is necessary to substantially impregnate the scrim being impregnated at any specific time.

In one presently preferred embodiment which would result from the system and methods of the present application, the upper 122 and the lower 124 zones of the microporous membrane 101 possess pores which have a size providing the desired filtration efficiency or particle removal. Generally, the average size of the pores of the upper zone and the lower zone will be about one (1) micron or less, and can typically range from about 0.01 microns to about one (1) microns. More preferably, the average size of the pores of each zone will range from about 0.2 microns to about 0.5 microns. This zone microporous membrane is preferably narrow. In a particularly preferred embodiment, the average pore size of the upper zone is substantially the same as the average pore size of the lower zone. By "substantially the same," it is meant that the average pore size of the upper zone does not differ from that of the lower zone, and vice versa, by more than about twenty-five (25%) percent.

One important feature of one preferred embodiment of the reinforced, three-zone microporous membrane 101 (see FIG. 7) produced by the systems and methods of the present application is that the upper and the lower zones have substantially the same thickness so as to provide geometric symmetry around the central axis of the membrane. These zones should be as thin as possible in order to minimize the pressure drop across the reinforced, three-zone microporous membrane while being sufficiently thick to yield desired particulate removal. The individual thickness of each of the upper and lower zones will generally range from about twenty-five (25) microns to about one hundred (100) microns, preferably from about thirty-five (35) microns to about sixty (60) microns. The overall thickness of the reinforced, continuous, monolithic, geometrically symmetrical, microporous filtration membrane that would be produced by the system and method of the present application will generally not exceed about ten (10) mils.

The geometric symmetry of the microporous membrane produced under the systems and methods of the present application should minimize mechanical strains, reduce the likelihood of zone/layer separation of the three-zone membrane and generally improve the structural integrity of the three-zone membrane. These features are particularly important to fan-fold pleated cartridge arrangements, where both sides of the microporous membrane are expected to bend equally well around the neutral (unyielding) axis of the reinforcing scrim. Such bending should result in an equal distribution of tension and compression forces in the pleat crests and troughs, such that neither side is burdened with an excessive tension or compression load, which would increase the possibility of damage and/or breech failure of the membrane at the pleat area. Furthermore, the unique thin cross-section, on both sides, of the three-zone membrane that would be produced using the systems methods of the present application should provide an advantage, in that the tension and compression forces should be minimized as the absolute radius from the center of the reinforcement to the outside surface of the three-zone membrane is minimized. However, it should be understood that the thickness of one of the upper or the lower zone could be considerably thicker than the other and still be within the teachings of the systems and methods of the present application.

The reinforced microporous three-zone membrane may be rolled and stored for use under ambient conditions. It will be understood that the reinforced, three-zone microporous membrane produced in accordance with the systems and methods of the present application may be formed into any of the usual commercial forms, such as, for example, discs or pleated cartridges.

For sterile filtration involving biological liquids, the reinforced, three-zone microporous membrane is sanitized or sterilized by autoclaving or hot water flushing. The reinforced, three-zone microporous membrane produced by the systems and methods of the present application should prove resistant to this type treatment, particularly when a hydrolytically stable nylon is used as described hereinabove, and retains its structural integrity in use under such conditions.

The reinforced, three-zone microporous membrane produced by the systems and methods of the present application should be easy to handle and readily formed into convoluted structures, e.g. pleated configurations. By reason of its improved flow characteristics, it should be capable of being employed directly in existing installations, without pumping modifications. Specifically, due to the improved flow rate, the existing pumps should actually operate at lower loads and thus would most likely have longer useful lives.

The reinforced, three-zone filtration membrane produced in accordance with the systems and methods of the present application should be characterized by unexpectedly high flow rates for a given differential pressure and also characterized by durability, strength, uniformity, lack of pinholes and bubble defects. In many applications, the preferred membranes could be used with either side of the membrane facing upstream.

As should be clear from the foregoing, the utilization of the original Dial-A-Por™ unit, as illustrated in FIG. 3, has undergone considerable evolution since the development of the initial Dial-A-Por™ unit shown in FIG. 3. As discussed above, the system 310 of FIG. 3 included an independent metering pump 24 operatively positioned prior to the Dial-A-Por™ unit including the thermal manipulation means 26, 32 for pumping the dope from the vessel 12 through the various thermal manipulation means and to reservoirs. The reservoirs were then operatively connected to a specific die, as illustrated in FIG. 5. As described above, the thermally manipulated dope was then moved from the reservoir to each respective die utilizing a metering pump to controllably deliver the dope to the respective die at the required pressure for applying the thermally manipulated dope to the scrim.

During the evolution from the single Dial-A-Por™ unit to the multiple Dial-A-Por™ unit of the present application, alternative dope moving means or systems were developed. As described earlier with respect to patent application Ser. No. 09/022,295, the vessel was typically maintained in an inert nitrogen atmosphere from about zero (0) to about fifty (50) psig. The high end of the pressure developed by the inert nitrogen atmosphere was found sufficient to move the dope from the vessel to and through the Dial-A-Por™ units and to the inlet of the metering pumps which were operatively connected to each of the dies. Thus, the metering pump 24 of the original Dial-A-Por™ unit (see FIG. 3) was not required when multiple Dial-A-Por™ units were operatively connected to the Vertical Coating Line of FIG. 5.

While a plurality of possible pressure and pumping systems and various combinations thereof have been found to be operative, one key to successfully operating the multiple Dial-A-Por™ system 10 of the present application is to provide sufficient pressure or force to move the dope to and through the Dial-A-Por™ units, regardless of the pressure source or dope moving means, and to specifically control the amount of dope delivered to each die.

As illustrated in FIG. 8, one presently preferred multiple Dial-A-Por™ unit 10 includes the vessel 12 being pressurized to a sufficiently high pressure, presently preferably, about forty-five (45) psig. The dope is moved from the storage vessel to and through each specific Dial-A-Por™ unit(s) 25, 140, 142 via the pressure on the vessel. After the dope has been thermally manipulated, by one, two or three Dial-A-Por™ units, the thermally manipulated dope moves by the pressure to the inlet of a flow control valve, a metering pump or other precision flow control device, such as, for example, the presently preferred metering pump available from Roper, Pump Company, model No. X5SS1PTY9JOLW, Type I, which then moves the dope to each die. The metering pumps 400, 402, 404 are effective to controllably deliver the appropriate amount of the thermally manipulated dope to the respective dies 126, 128, 130 at the appropriate rate. The metering pumps or the flow control devices are specified and selected based upon the precision flow control requirements for a specific application.

In the presently preferred multiple Dial-A-Por™ unit configuration, each die has its own flow control device or metering pump 400, 402, 404. The flow control devices or metering pumps 400, 402, 404 control the deliver of the thermally manipulated dope to each of the dies 126, 128, 130, respectively, with the desired amount of thermally manipulated dope for application to the scrim needed to properly form the desired three phase, reinforced, microporous membrane at the dope processing site 14.

One of the many possible alternatives to this specific system arrangement or configuration includes operatively positioning valves between each metering pump and each die for diverting the thermally manipulated dope from the dies to a waste container 410, 412, 414 or back to a previous location in the process, such as, for example, prior to or after the diversion valves 192, 196, 200.

Thus, in the presently preferred multiple Dial-A-Por™ system 10, one or multiple storage vessels are pressurized to about forty-five (45) psig for moving the dope from the vessel to one, two or three Dial-A-Por™ units under sufficient pressure to move the thermally manipulated dope to the inlet of a flow control or metering pump 400, 402, 404. The metering pump for each die then controllably delivers the thermally manipulated dope to each die at a rate appropriate for each of the zones of the specific three-zone reinforced microporous membrane being produced.

As illustrated in FIG. 9, a metering pump can be positioned with each of the Dial-A-Por™ units, similar to the original Dial-A-Por™ unit of FIG. 3, and provide the pressure or force necessary to move the thermally manipulated dope all the way from the vessel(s) 12, 152, 154 to each die 126, 128, 130 without the incorporation of any other flow or metering pumps between each Dial-A-Por™ unit and the respective die (see FIG. 8). However, one potential disadvantage of this particular system configuration is that the Dial-A-Por™ unit(s) will be subjected to the higher pressures required to provide the thermally manipulated dope to each die and, thus, the specification for each of the components of the Dial-A-Por™ unit(s) would most likely require higher cost components than would the system components using the presently preferred method of moving the dope from the vessel through the Dial-A-Por™ under pressure to the inlet of metering pumps for application to the scrim, as is presently preferred.

Figure 10:
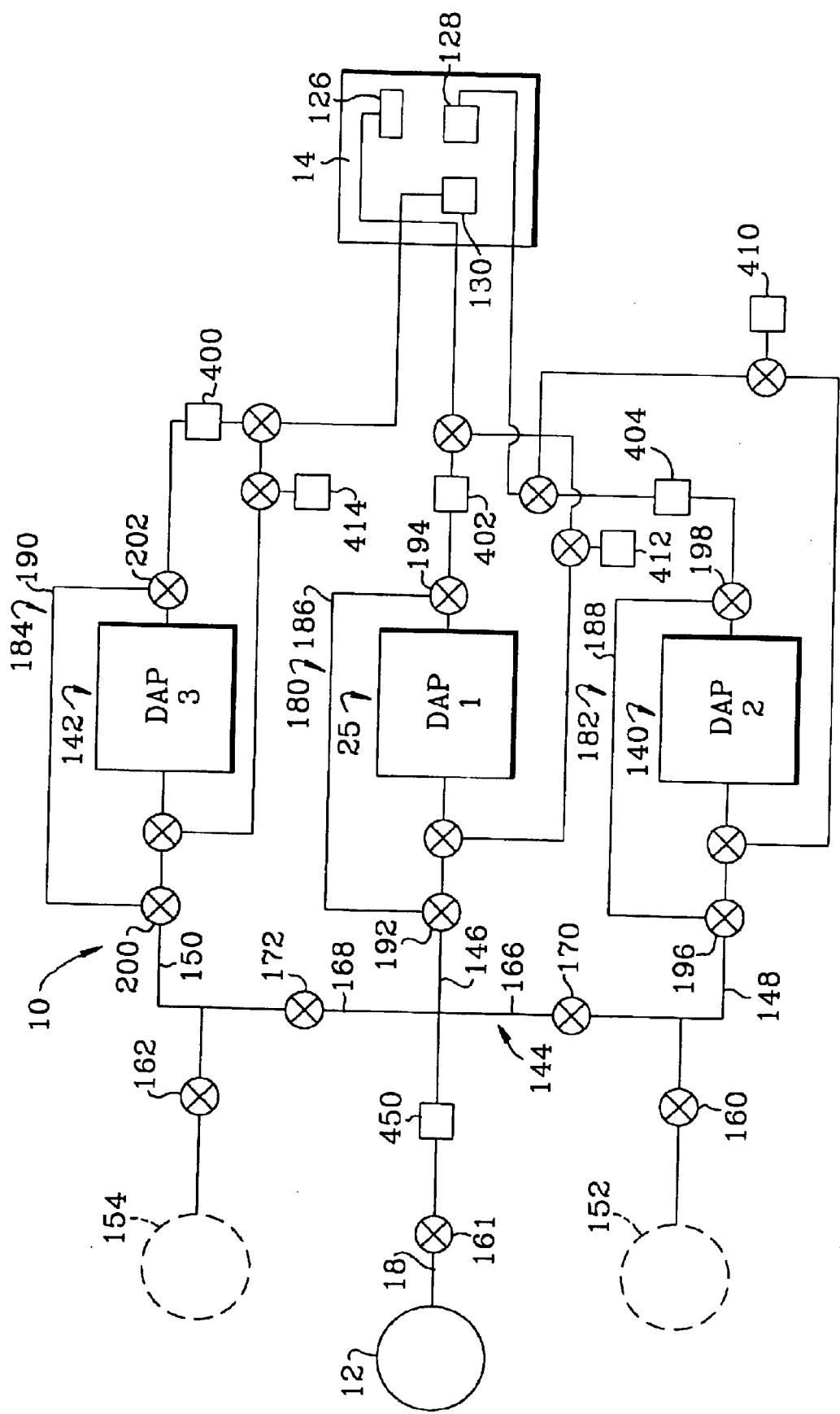
FIG. 10 is a schematic representation of still another alternative system of the present application.

Another possible alternative multiple Dial-A-Por™ system is illustrated in FIG. 10. In this alternative system, the flow control pumps or metering pumps 400, 402 and 404 and the recirculation systems and waste collection vessel system of FIG. 8 are utilized, but the metering pumps of FIG. 3 are replaced by fluid transport pumps (not shown) which essentially replace the pressure provided by pressurizing the vessel 12 described above. The fluid transport pumps are used to move the dope from the storage vessel, which must be under sufficient pressure to move the dope from the vessel to the inlet of the fluid transport pump, through the Dial-A-Por™ units to the individual flow control units, such as, for example, a flow control valve or metering pumps for each die.

This alternative system has several disadvantages. If a flow control valve is utilized, then the Dial-A-Por™ units would be subjected to the higher pressures required at the dies and a more complicated flow control system would be required to meter the flow to the dies. If the metering pumps are inserted between the Dial-A-Por™ units and the dies, the system will become more complicated in that a control system would be required to balance the pressures between the two pumps in series.

An additional possible alternative of many possible alternatives would be to position one fluid transport pump 450 between the primary storage vessel and the fluid transportation system 144. In this alternative system, only one fluid transport pump 450 would be used to move the dope from the vessel to and through the Dial-A-Por™ unit(s) to the inlet port of one, two or all three of the metering pumps or flow control valves positioned between each Dial-A-Por™ unit(s) and its respective die.

As above, there are several disadvantages. If a flow control valve is utilized, then the Dial-A-Por™ units would be subjected to the higher pressures required at the dies and a more complicated flow control system would be required to meter the flow to the dies. If the metering pumps are inserted between the Dial-A-Por™ units and the dies, the system will become more complicated in that a control system would be required to balance the pressures between the two pumps in series.

Figure 11:
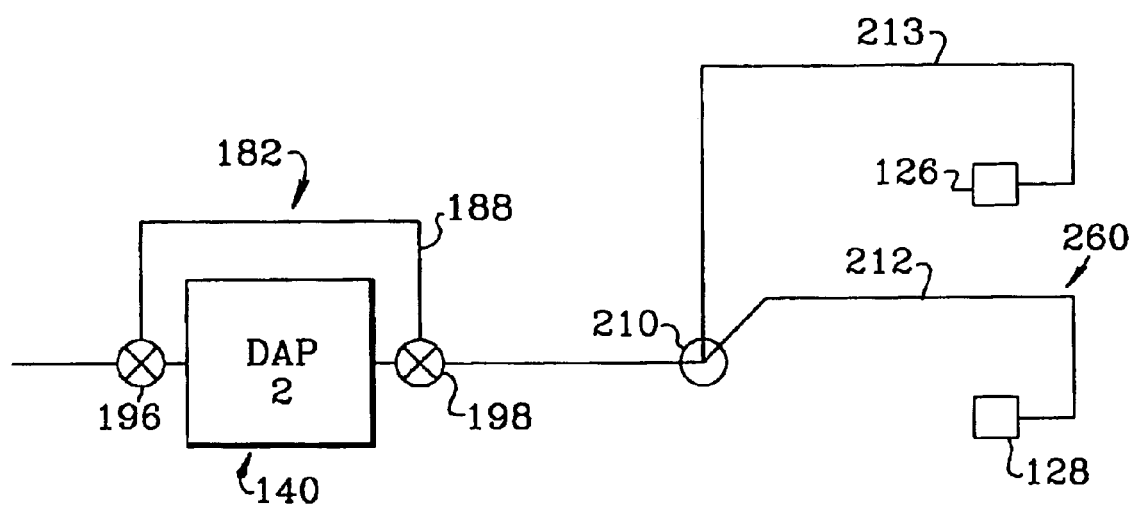
FIG. 11 is a schematic representation of an alternative Dial-A-Por™ apparatus modified to supply dope to two separate dope application mechanisms or means at the dope processing site.

As illustrated in FIG. 11, in yet another of a plurality of possible configurations of the systems and methods of the present application, one vessel could provide a mother dope to one Dial-A-Por™ unit 140 for thermal manipulation to a specific temperature to produce a specific pore size then deliver the so manipulated dope to the two slot dies 126, 128 via a system 260 including a split transportation means 210 having branches 213, 214, operatively connected to slot dies 126, 128, respectively. It is understood that the flow to each die must be controlled in some manner, as discussed above.

From the foregoing descriptions, it should now be readily apparent that the systems of the present application can be adapted to provide for the manufacture of a plurality of possible three zone, reinforced microporous membrane. One key is that whatever means are utilized for moving the dope from the pressurized storage vessel(s) through one, two or three Dial-A-Por™ units must be effective to provide a sufficient volume of the thermally manipulated dope either to the inlet of a flow control device, such as, for example, a flow control valve or a metering pump for controlling the amount of thermally manipulated dope to be delivered to each die or must be effective to controllably deliver sufficient amounts of the thermally manipulated dope directly from the storage vessel to and through the one, two or three Dial-A-Por™ units to each individual die so as to enable sufficient dope to be applied to the scrim from each die during the manufacturing process at the dope processing site.

As stated above, the presently preferred system for both a single and a multiple Dial-A-Por™ system includes pressurizing the vessel to about forty-five (45) psig, which has proven sufficient to move the dope from one vessel through three Dial-A-Por™ units to three metering pumps, one metering pump between each Dial-A-Por™ unit and each die, and then utilizing the metering pumps to control the transfer of the thermally manipulated dope to each die for application of the dope to the scrim at the dope processing site.

PROPHETIC EXAMPLES

The following examples are directed to the production of reinforced, three-zone microporous membrane including the preparation of a mother dope, thermal manipulation of the mother dope to produce a dope that when applied to a scrim by dope application mechanism or means provides any one of a plurality of possible specific pore sizes in a specific performance zone of the final microporous membrane, the delivery of the dope to a dope processing site and the application of the dope to form the membrane at the dope processing site resulting in a reinforced, three-zone microporous membrane.

Until recently, mother dopes have been produced as described in U.S. patent application Ser. No. 09/022,295 and reinforced, three-zone microporous membrane has been produced using only one dope provided by a Dial-A-Por™ system but no reinforced, three-zone microporous membrane had been produced using the preferred systems and methods of the present application. The following two prophetic Examples describe how such reinforced, three-zone microporous membrane would be produced using the preferred systems and methods of the present application.

Prophetic Example 1

A mother dope of approximately a fourteen and one-half percent (14.5%) by weight Nylon 66 (Monsanto Vydyne 66Z), approximately seventy-seven and four-tenths percent (77.4%) by weight Formic Acid and approximately eight and one-tenth percent (8.1%) by weight methanol, is produced by the method disclosed in U.S. Pat. Nos. 3,876,738 and 4,645,602. Another method for producing such dopes is described in European Patent Application No. 0 005 536 to Pall.

The dope is processed in a vessel to a maximum temperature of about 28° C., after the nylon is added to the mixture, which should result in a FAOP of about 196 psi and a IBP of about 149.3 psi. The storage vessel containing the above mother dope is operatively connected to the three separate Dial-A-Por™ unit for thermal manipulation of portions of the mother dope. Then the vessel is pressurized to approximately forty-five (45) psi with nitrogen, to move the dope from the vessel to each of the Dial-A-Por™ units, each Dial-A-Por™ unit is connected to precision metering pumps to feed precise amounts of treated dope to one of each of the three coating dies.

Each Dial-A-Por™ unit or system for thermal manipulation (elevation of the dope temperature to a predetermined temperature) is activated and the target temperature is set to the specific target temperature for the dope to be delivered to each slot die. When the two heating mechanism or means and the cooling mechanism or means reached their respective target temperatures, dope valves are opened and dope is moved by pressure from the sealed vessel through each Dial-A-Por™ system, then on to precision metering pumps and the respective coating dies.

Since the results of the tests disclosed in the '295 application showed that the target temperature control of Tmax critical was accomplished to about 0.15° C. below the ±0.2° C. target, and the thermal response testing generated smooth and repeatable curves, it was established that the dope/membrane material properties resulting from the Dial-A-Por™ systems were precise and repeatable.

Thus, at this point in our examples, we have merely described the preparation of a mother dope and the thermal manipulation of the mother dope to provide one of a plurality of possible pore size producing dopes after the controlled thermal manipulation.

Once portions of the mother dope are thermally manipulated to a specific pore-size-producing dope temperature and cooled to an appropriate processing temperature, each thermally manipulated dope is delivered preferably via one precision metering pump described above from a respective Dial-A-Por™ unit to the selected one of the three slot dies of the apparatus at the dope processing site as described above and in U.S. patent application Ser. Nos. 09/040,979 and 09/040,816 to produce a geometrically symmetric and pore size symmetric reinforced, three-zone membrane with an "open" (large pore size) scrim encapsulated center zone.

At the dope processing site, non-woven Polypropylene bicomponent fiber web or scrim suitable for preparation of the reinforced, three-zone membrane (commercially available from Freudenberg under the tradename Viledon®, Grade # F02432), having a basis weight of nominally 30 gm/sq.meter is processed by the method taught in the Ser. Nos. 09/040,979 and 09/040,816 applications. The scrim is pre-treated with a mild Corona Discharge to enhance its wetability prior to being pressure impregnated. The larger pore size dope is provided from the Dial-A-Por™ unit operatively connected to the first slot die (impregnating die) and is used to pressure impregnate the scrim, with an impregnation weight of about seven (7) gm/sq.meter of Nylon solids. The nylon solids are provided from the dissolved nylon in the dope solution, which can be, for example, a fourteen and one-half (14.5) wt % nylon solution (approximately 50 grams of liquid dope per square meter), which is sufficient to impregnate and fill the void volume of the scrim, creating the first zone of large pore size dope integral with the supporting scrim.

Almost immediately following the pressure impregnation of the scrim with the dope from the first slot die, both sides of the pressure impregnated scrim are essentially simultaneously coated with substantially even layers of a smaller pore size dope received from the second and third Dial-A-Por™ units, respectively. In this example, the total coating weight delivered to the two sides is about thirty-seven (37) gm/sq.meter of Nylon solids in about a fourteen and one-half (14.5) wt % solution (approximately 260 grams of liquid dope per square meter), with the total being split between the two streams of dope feeding onto the two sides of the pressure impregnated scrim, so that both sides are substantially evenly coated with the two streams of dope which have been separately processed thorough their respective Dial-A-Por™ units to substantially the same end-point of maximum temperature for producing substantially equivalent small pore size membrane upon coating and quenching. These should create the second and third zones of the finished membrane from the small pore size dope. The grand total application of both dopes (large and small pore size) is, thus, approximately forty-four (44) gm/sq.meter Nylon solids. The thus coated three-zone structure is then quickly brought into contact with a Marinacco-style quench solution, which simultaneously quenches the three-zone structure from the outer surfaces of the small pore size dope, such that a continuous microporous membrane structure is formed. The quenched membrane is then washed, dried under X & Y direction dimensional restraint, and tested, in the usual manner.

Prophetic Example 2

A second three-zone membrane is prepared in nearly identical manner as in Example 1, with the exception that one of the coating sides of the pressure impregnated scrim (in this case, Zone Two) is coated with dope from it's respective Dial-A-Por™ unit which had been processed to substantially the same end-point of maximum temperature for producing substantially equivalent large pore size membrane as the dope processed from the Zone One (impregnating zone) Dial-A-Por™ and slot die combination. Zone Two is thus coated with approximately fifteen (15) gm/sq.meter Nylon solids from the large pore size dope produced by its respective Dial-A-Por™ units or alternatively having the Zone One Dial-A-Por™ unit provide the same dope. The opposite side (Zone Three) is simultaneously coated with the approximately twenty-two (22) gm/sq.meter Nylon solids from small pore size received from the appropriate Dial-A-Por™ unit. After two-side simultaneous quenching, washing and restrained drying, the resultant finished membrane would achieve a continuous, substantially geometric symmetry around the neutral axis of the reinforcing scrim, but have very different pore size attributes on both sides of the scrim. (i.e., Pore Size Asymmetric).

Discussion of the Prophetic Examples

As can be seen in Table II of the Ser. No. 09/040,979 and the Ser. No. 09/040,816 applications, the Example 1 membrane produced in accordance with the systems and methods of the present application should show a clearly improved flow rate over the standard (control) membrane as disclosed in those applications. It is believed that a similar membrane produced in accordance with the systems and methods of the present application would also have a clearly improved flow rate over a standard (control membrane) of the same application.

The raw water flow rate (Q, expressed as cc/min clean deionized water for a nominally forty-seven (47) mm test disc (13.5 cm$^2$ test area) under water pressure of 5 psid) should show about a twenty (20%) percent improvement, while the integrity, as measured by Initial Bubble Point, should be surprisingly increased by about six (6%) percent, for the same overall membrane thickness. This expected improvement potentially should provide a double benefit, these being improved clean water flow rate and improved integrity as measured by IBP. The increase in Initial Bubble Point should be corroborated by both the increase in membrane Foam-All-Over-Point, and the decrease in the ASTM Mean Flow Pore size rating.

The Example 2 membrane should provide a stunning improvement in flow rate over the standard (control) membrane as disclosed in those applications of about seventy-eight (78%) percent, while retaining almost the same integrity attributes in IBP and FAOP. The Mean Flow Pore (MFP), a more universally recognized method for mean pore size, of which FAOP is attempting to approximate, should show the expected difference: a larger mean flow pore is consistent with a higher flow rate, and this indicates that there is, by the flow averaging method, a wider distribution of pore sizes in the Example 2 membrane if it were compared to a control membrane. This should not, however, diminish the importance of the flow improvement with essentially the same Initial Bubble Point, which is a rating of the single largest pore on the membrane, and a measurement which the microfiltration industry has come to rely upon for testing the integrity of a membrane. Thus, Example 2 could illustrate another advantage to the membrane produced in accordance with the systems and methods of the present application, which is the ability to produce, in a single membrane, three separate zones of performance which, when oriented by decreasing pore size, can provide a novel, surprisingly thin section combination reinforced prefilter and final filter, having geometric symmetry, good integrity, and very high flow rates.

Summary of the Prophetic Examples

The systems and methods of the present application for producing reinforced, three-zone membrane should provide microporous membrane having markedly improved flow rates in filtration applications, for their pore size attributes, as compared to standard products now common in the membrane filtration industry. The relatively thin cross-sections of these three-zone membrane products should result in membrane cartridges having more surface area and even higher throughputs. This combination should translate into a higher value added product for the filtration customer.

The resultant three-zone microporous membrane was composed of three zones that were continuously joined by the molecular entanglement of the polymers which occurred in the liquid state of the dope after each of the outer zone dopes was coated onto the dope of the central zone and prior to quenching. This is significantly different from the prior art lamination process wherein three separately formed membranes were quenched and then laminated together. Thus, it is clear that the liquid to liquid mixing of the central zone liquid dope with each of the outer zones liquid dope, prior to quenching, resulted in a three phase, reinforced, microporous membrane having a continuous polymer entanglement on the molecular level, as illustrated by the scanning electron photo micrographs.

It is believed that routine experimentation with substrates, pre-treatments, zone coating weights, polymers, dope viscosity, thickness, pore sizes, and orientations of the zones with respect to pore sizes will yield optimized membrane products which would have superior performance to existing membrane products. Other membrane applications which will benefit from the ability to customize zone performance will include (as examples), diagnostic products using body fluids, transfer membranes, separation devices, medical devices, and others which will become obvious to those skilled in the arts of membrane science.

Based on the above, it should be clear that the teachings of the present application which includes the use of at least one mother dope batch processed through at least one and as many as three separate Dial-A-Por™ units to deliver different pore size producing dope to an appropriate application mechanism or means for application first to a scrim and then to each side of the dope impregnated scrim to induce the intermingling of the different dope applications provided in fluid form from the three dies prior to quench provides the three-zone, continuous membrane, as described in the aforementioned patent applications.

ACTUAL EXAMPLES

The actual following examples are directed to the production of reinforced, three-zone microporous membrane including the preparation of a mother dope, thermal manipulation of the mother dope to produce a dope that when applied to a scrim by dope application mechanism or means provides any one of a plurality of possible specific pore sizes in a specific performance zone of the final microporous membrane, the delivery of the dope to a dope processing site and the application of the dope to form the membrane at the dope processing site resulting in a reinforced, three-zone microporous membrane.

Until recently, mother dopes have been produced as described in U.S. patent application Ser. No. 09/022,295 and reinforced, three-zone microporous membrane has been produced using only one dope provided by a Dial-A-Por™ or system for thermal manipulation (elevation of the dope temperature to a predetermined temperature) but no reinforced, three-zone microporous membrane had actually been produced using the preferred systems and methods of the present application. The following actual Examples describe how such reinforced, three-zone microporous membrane have been produced using the preferred systems and methods of the present application.

Actual Example 1

A mother dope, identified as Dope # 00B027, of about fourteen and one-half percent (14.5%) by weight Nylon 66 (Monsanto Vydyne 66Z), about seventy-seven and four-tenths percent (77.4%) by weight Formic Acid and about eight and one-tenth percent (8.1%) by weight methanol, was produced by the method disclosed in U.S. Pat. Nos. 3,876,738 and 4,645,602, the disclosure of each is herein incorporated by reference.

The dope was processed in a vessel to a maximum temperature of about twenty-eight degrees (28°) C., after the nylon was added to the mixture, and allowed to mix as per the normal cycle. It was believed that the temperature control equipment which maintains the maximum temperature through this mother dope mix cycle was not as precise as the Dial-A-Por™ system's temperature regulation; and may typically vary by as much as about ±0.5 degrees C. or more. This will affect the ability to precisely replicate the characteristics of a given mother dope, even when the same formulation was repeated.

To gain an appreciation of the pore size of a microporous nylon membrane cast directly from this mother dope, a small portion (~100 cc) of the mother dope was cast and quenched in a laboratory apparatus which simulates the casting process described in U.S. Pat. No. 3,876,738, to Marinaccio and Knight, to produce a nominally five (5) mils thick wet, non-reinforced layer of microporous nylon membrane. This membrane was washed in deionized water, then folded over onto itself, about ten (10) mils wet, and dried under conditions of restraint to prevent shrinkage in either the machine direction (x-direction) or cross direction (y-direction). This produced a small sample of dried double layer non-reinforced microporous nylon membrane having a combined thickness of about five (5) mils after shrinkage in thickness (z-direction) of the collapsing wet pore structure was complete.

An Initial Bubble Point test was attempted, as described in U.S. Pat. No. 4,707,265, using deionized water as a wetting fluid. The resulting membrane pore structure was so tight (i.e. small pores), that the Initial Bubble Point was higher than the measurement system gauge could read (>100 psig).

A second small portion of the mother dope was cast, quenched, folded onto itself, then dried under restraint to produce a substantially identical sample as described above. This sample was wetted in a solution containing about sixty percent (60%) by weight Isopropyl Alcohol and about forty percent (40%) by weight deionized water. This solution has a lower surface tension than that of pure water, thus providing a reduction in capillary expulsion pressure needed to perform the Initial Bubble Point test. The approximate surface tension of the 60/40 IPA/H$_2$O mix is about twenty-four (24) dyne/cm, where as the surface tension of pure DI water is about seventy-three (73) dyne/cm. The test was performed, and Initial Bubble Point pressure was recorded as about fifty-four (54) psig in Isopropyl Alcohol.

Because the surface tension of the wetting fluid is directly proportional to the measured bubble point pressure, it is estimated that the effective Initial Bubble Point of such a membrane would be about a factor of three times (3x) greater if tested in pure water, or about one-hundred-sixty-two (162) psig in pure water. By industry convention, such a nylon microporous membrane might be rated as nominally about 0.02μ to about 0.04μ in pore size. This was evidence that the mother dope, as formulated and produced for this example, had a very small pore size prior to being processed by each Dial-A-Por™ unit, and further processed into a three-zone microporous nylon membrane by a vertical casting apparatus at a dope processing site.

After the above tests, the storage vessel containing the above mother dope was operatively connected to the three separate Dial-A-Por™ units for thermal manipulation of portions of the mother dope. Then, the vessel was pressurized to about forty-five (45) psi with nitrogen, to move the dope from the vessel to each of the Dial-A-Por™ units, each Dial-A-Por™ unit was operatively connected to a precision metering pump for transporting precise amounts of thermally manipulated dope to a respective one of each of the three coating dies.

Each Dial-A-Por™ unit or system for thermal manipulation (elevation of the dope temperature to a predetermined temperature) was activated and the target temperature was set to the specific target temperature for the dope to be delivered to each of the three slot dies. When the two heating mechanisms or means and the cooling mechanisms or means reached their respective target temperatures, dope valves were opened and dope was moved under pressure from the sealed vessel through each Dial-A-Por™ unit, then on to each precision metering pump and each respective coating die.

The specific target temperatures for each of the three Dial-A-Por™ units, feeding the respective Membrane Zones, was as follows:

Membrane Zone One (the impregnation zone of the reinforcing substrate or scrim), the target maximum temperature was fifty-four degrees (54.0°) C. to effect a relatively lower bubble point impregnation dope attribute, followed by cooling to about twenty-one degrees (21°) C., to effect a useful dope viscosity for impregnation and coating.

Membrane Zone Two, (the coating zone applied on the same side or "near" side of the reinforcing substrate as the impregnation die), the target maximum temperature was fifty-four degrees (54.0°) C. to effect a relatively lower bubble point coating on the Membrane Zone Two side, which was substantially the same as the bubble point of the impregnation zone, followed by cooling to about twenty-one degrees (21°) C., to effect a useful dope viscosity for coating.

Membrane Zone Three (the coating zone applied on the opposite side of the reinforcing substrate from the impregnation die), the target maximum temperature was forty-five degrees (45.0°) C., to effect a relatively higher bubble point coating in the Membrane Zone Three side, followed by cooling to about twenty-one degrees (21°) C., to effect a useful dope viscosity for coating. Since the Membrane Zone Three side contains the relatively higher bubble point as compared to the (substantially equal) bubble points of the Membrane Zone One and Membrane Zone Two sides, the product produced for this example will be a geometrically symmetric, pore size asymmetric nylon microporous membrane.

At this point in our example, we have described the preparation of a mother dope, and the thermal manipulation of the mother dope to provide one of a plurality of possible pore size producing dopes after the controlled thermal manipulation.

Once portions of the mother dope were thermally manipulated to a specific pore size producing dope temperature and cooled to an appropriate processing temperature, each thermally manipulated dope was delivered preferably via one precision metering pump described above from a respective Dial-A-Por™ unit to the selected one of the three slot dies of the apparatus at the dope processing site as described above and in U.S. patent application Ser. Nos. 09/040,979 and 09/040,816 to produce a geometrically symmetric and pore size asymmetric reinforced, three-zone membrane with a first "open" (large pore size) scrim encapsulated center zone (Membrane Zone One), and one "open" (large pore size) outer zone on one of the sides of the scrim (Membrane Zone Two), and one "tight" (small pore size) outer zone (Membrane Zone Three) opposite the other outer zone.

At the dope processing site, non-woven Polypropylene bicomponent fiber web or scrim suitable for preparation of the reinforced, three-zone membrane (commercially available from Freudenberg under the tradename Viledon®, Grade # F02432), having a basis weight of nominally 30 gm/sq.meter was processed by the method taught in the Ser.

Nos. 09/040,979 and 09/040,816 applications. The scrim was pre-treated with a mild Corona Discharge to enhance its wetability before being pressure impregnated. The relatively larger pore size dope, was provided from the Dial-A-Por™ unit operatively connected to the first slot die (or Membrane Zone One impregnating die) and was used to pressure impregnate the scrim, with an impregnation weight of about twelve and one-half (12.5) gm/sq.meter of Nylon solids. The nylon solids were provided from the dissolved nylon in the dope solution, which were, in this example, a fourteen and one-half (14.5) wt % nylon solution (about eighty-six and two-tenths, 86.2, grams of liquid dope per square meter), which was sufficient to impregnate and fill the void volume of the scrim, and leave a small excess of coating dope on the application side of the scrim creating the first zone of large pore size dope integral with the supporting scrim.

Within a short distance of travel following the pressure impregnation of the scrim with the dope from the first slot die, both sides of the pressure impregnated scrim were essentially simultaneously coated with dope received from the other two slot dies, which was provided from their respective Dial-A-Por™ units, as described above.

Membrane Zone Two was thus coated with about thirteen (13.0) gm/sq.meter Nylon solids from the large pore size dope produced by its respective Dial-A-Por™ unit. Membrane Zone Two was applied from the same side of the scrim as the impregnation die, i.e. both dies for Membrane Zone One and Membrane Zone Two (near) faced the same direction. Membrane Zone Two contained dope that was substantially the same bubble point as the impregnation zone (Membrane Zone One). Because there was a small excess of dope carrying down the (Membrane Zone One oriented application die) face of the scrim, the Membrane Zone Two application weight was lowered relative to Membrane Zone Three, in order to maintain geometric symmetry. The opposite side (Membrane Zone Three) was substantially simultaneously coated with the about eighteen and one-half (18.5) gm/sq.meter Nylon solids from the small pore size dope received from its respective Dial-A-Por™ unit. The total coating weight from all dies thus applied to the scrim was about forty-four (44) gm/sq.meter. After two-side simultaneous quenching, washing and restrained drying, the resultant finished membrane achieved a continuous, substantially geometric symmetry around the neutral axis of the reinforcing scrim, but had very different pore size attributes on both sides of the scrim. (i.e., Pore Size Asymmetric).

Figure 12A:
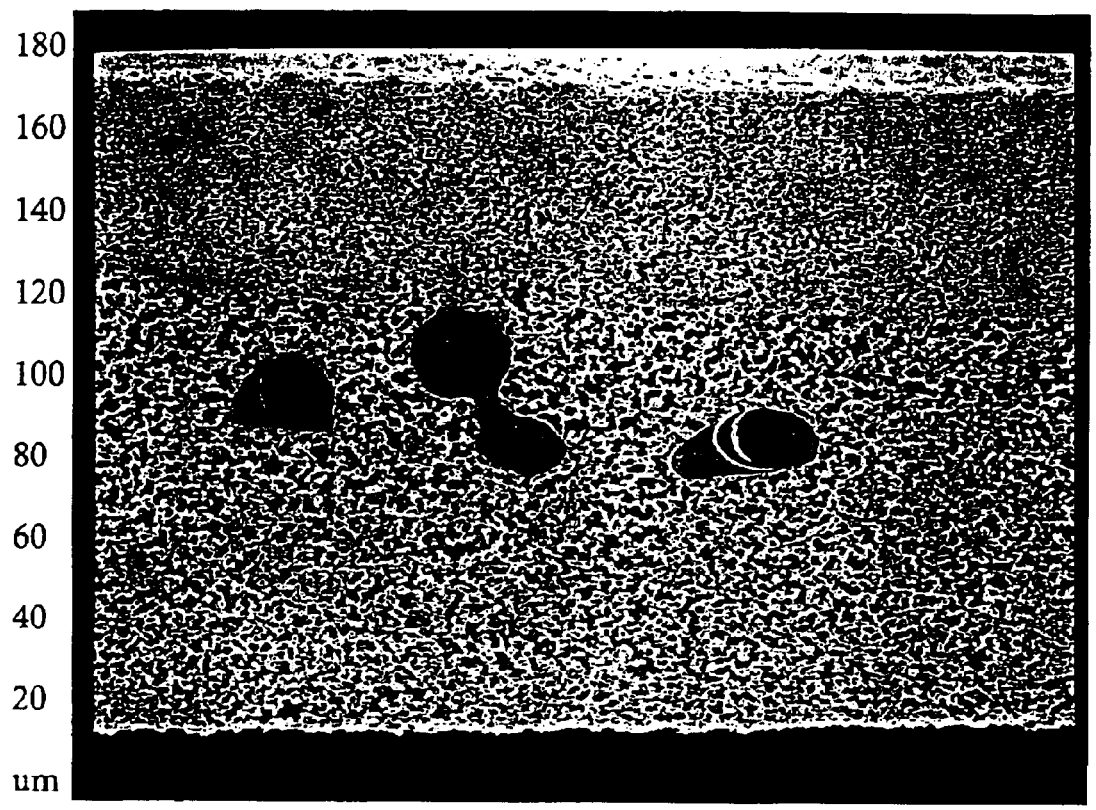
FIGS. 12a–b are scanning electron photo micrographs of a reinforced three-zone microporous membrane manufactured by the systems and methods of the present application illustrating the inter-face of the three porous zones at 500× and 2,500×.
Figure 12B:
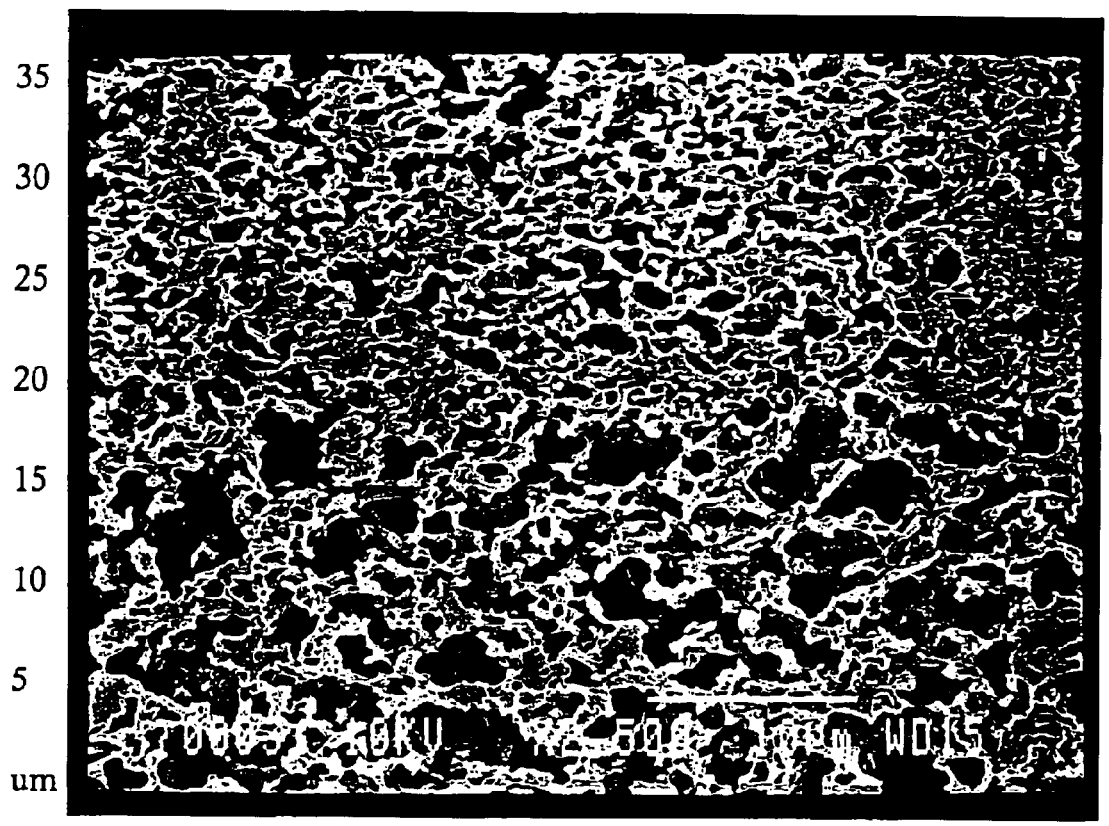

The resultant three-zone, geometrically symmetric, pore size asymmetric nylon microporous membrane of this Actual Example One had the measured attributes as illustrated in Table 1. For illustration, the three-zone asymmetric pore structure is shown in cross section by Scanning Electron micrograph in FIGS. 12a–b.

Description of the Attribute Measurements made on the membrane as reported in Table 1 are as follows:

Membrane I.D.:

The production identification of a specific roll of membrane.

Coating Weight:

The coating weight delivered to each of the three separate zones was given, which was calculated directly from the measured volumetric flow rate delivered by each zone pump, spread over the moving web at the process casting width. The total of all zones was the expected coating weight for the finished product.

FFBP (60/40 IPA wet):

This test is a variant of the K-sub-L test which has been promoted by the PALL® corporation as a measurement of pore size, and is described in PALL® literature and validation guides. Here, the knee location was found, using a wetting fluid which was about sixty percent (60%) by weight Isopropyl alcohol, and about forty percent (40%) by weight water. This measurement was applied to the same in-process sample as was tested for in-process thickness. The value reported was an average of two samples; one from the beginning and one from the end of the roll.

Thickness:

A process gage was used to measure three points across the width of a short length of an in-process sample. This sample was taken from the wet-as-cast, and DI water washed membrane, in the V/C/L production area. The sample was dried under restraint in crossweb and machine direction. Three points spanning the crossweb sample are tested with the process gage, and used to calculate an average which was reported. The wet-as-cast roll then proceeded to the drying process.

Initial Bubble Point (D.I. water wet):

This was a final quality check, and was tested as previously described.

Water Flow Rate:

A precision water flow meter was mounted downstream of a one-hundred-forty-two (142) mm diameter filter disc housing (Millipore sanitary design, Millipore catalogue No. 302200). The housing was directly tapped on the inlet side and the outlet side so that a differential pressure gage could be used to measure the instantaneous differential pressure across the membrane. A precision pressure transducer was connected across the housing. Fresh filtered 1 megohm D.I. water under pressure, nominally about thirty (30) psi, was plumbed into the housing with means to regulate flow rate. By varying the clean water flow rate through the housing, and measuring the differential pressure at each flow rate, a pressure vs. flow rate graph was constructed. From this, a flow rate was either extrapolated or interpolated, expressed here in the familiar units of cc/min flow for an equivalent of a forty-seven (47) mm diameter disc, nominally about thirteen and one-half (13.5) square centimeter equivalent surface area, at about a five (5.0) psi differential pressure.

Coulter Mean Flow Pore Size:

The Coulter Porometer II from Coulter instruments was used to measure the Mean Flow Pore in accordance with the instrument manufacturer's instructions, using Porofil wetting fluid, and a thirty-seven (37) mm housing. Three samples were tested, and the average value was reported.

Actual Example 2

A second mother dope having the same formulation as described in Actual Example 1 above was prepared, under about the same conditions. The dope was characterized as before, and the results are also reported in Table 1. Within the limits of common cause error, the dope was a replicate of the Example 1 dope.

A three zone, geometrically symmetric, pore size asymmetric nylon microporous membrane was prepared under substantially the same conditions as described in Actual Example 1. The only substantive difference was the selection of the specific target maximum temperatures for the three separate Dial-A-Por™ units. These specific target temperatures were as follows. For Membrane Zone One (impregnation), the target maximum temperature was fifty-seven degrees (57.0°) C. For Membrane Zone Two (near side), the target maximum temperature was also fifty-seven degrees (57.0°) C. For Membrane Zone Three (opposite side), the target maximum temperature was fifty degrees (50.0°) C.

Figure 13A:
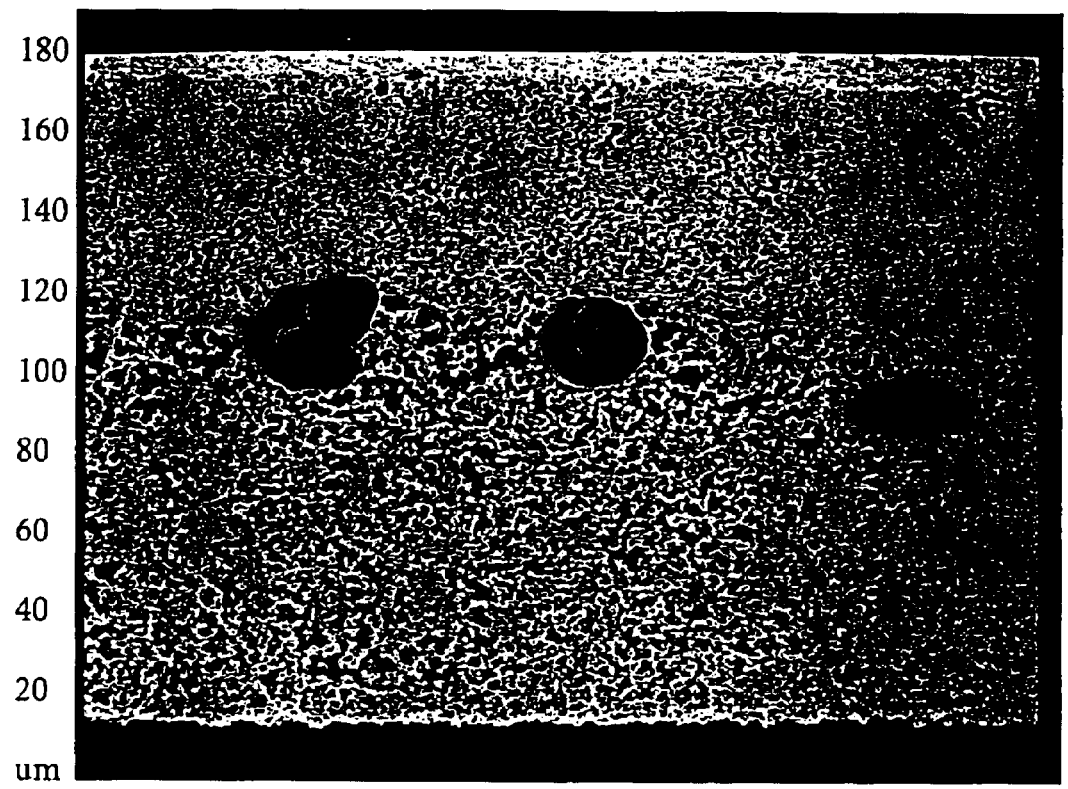
FIGS. 13a–b are scanning electron photo micrographs of a reinforced three-zone microporous membrane manufactured by the systems and methods of the present application illustrating the interface of the three porous zones at 500× and 2,500×.
Figure 13B:
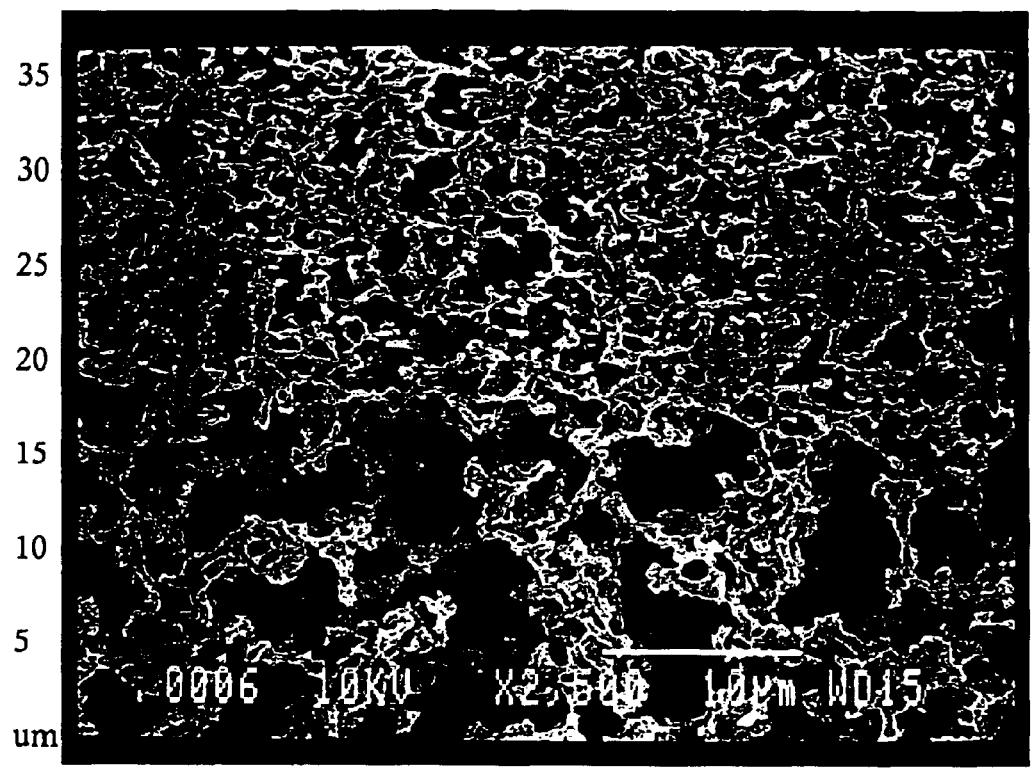

The resultant three-zone, geometrically symmetric, pore size asymmetric nylon microporous membrane was tested and reported in Table 1. For illustration, the three-zone asymmetric pore structure of this Actual Example 2 membrane is shown in cross section by Scanning Electron micrograph in FIGS. 13a–b. The resulting membrane has a substantially larger pore size rating and a higher clean water flow rate than the membrane of Actual Example 1. This was as expected, considering the relatively higher maximum Dial-A-Por™ unit target temperatures used in the processing of this membrane.

Actual Example 3

A third mother dope having the same formulation as described in Actual Example One (1) was prepared, under substantially the same conditions as Actual Examples One (1) and Two (2). The dope was characterized as before, and the results are reported in Table 1. Within the limits of common cause error, the dope was a replicate of the Example One dope.

A three-zone, geometrically symmetric, pore size asymmetric nylon microporous membrane was prepared under substantially the same conditions as described in Actual Example One. The only substantive differences are the selection of the specific target maximum temperatures for the three separate Dial-A-Por™ units. These specific target temperatures are as follows. For Membrane Zone One (impregnation), the target maximum temperature was sixty-two degrees (62.0°) C. For Membrane Zone Two (near side), the target maximum temperature was also sixty-two degrees (62.0°) C. For Membrane Zone Three (opposite side), the target maximum temperature was fifty-four degrees (54.0°) C.

Figure 14A:
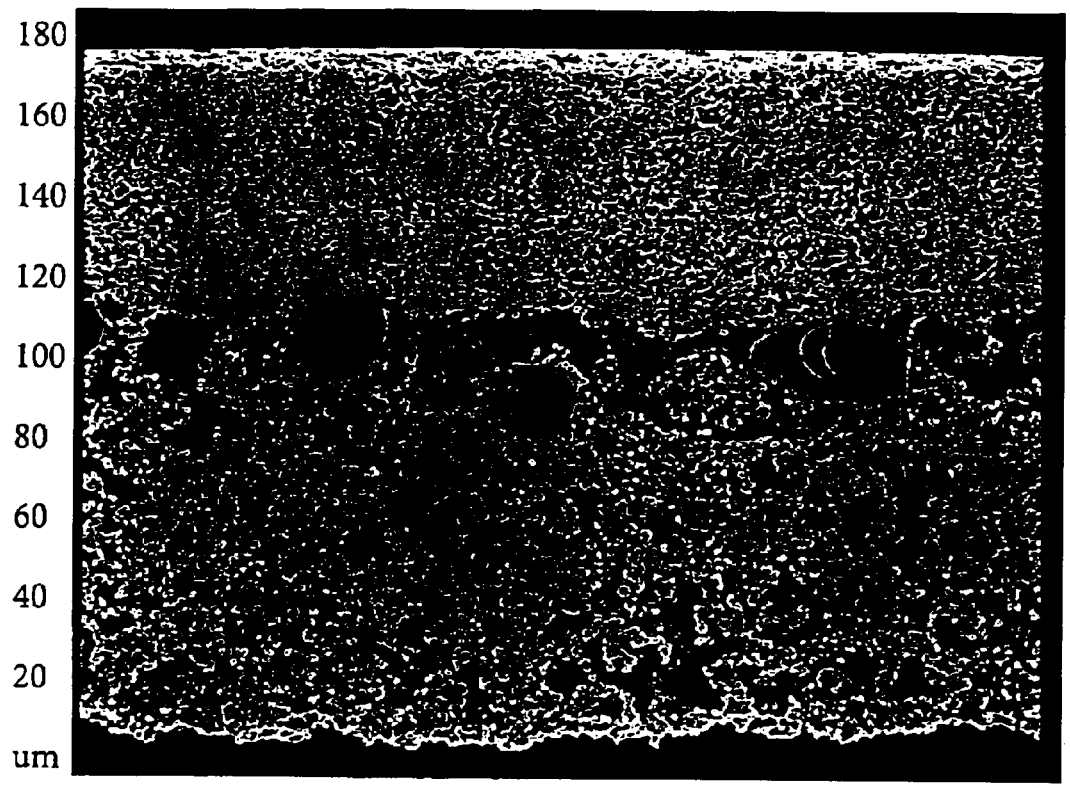
FIGS. 14a–b are scanning electron photo micrographs of a reinforced three-zone microporous membrane manufactured by the systems and methods of the present application illustrating the inter-face of the three porous zones at 500× and 2,500×.
Figure 14B:
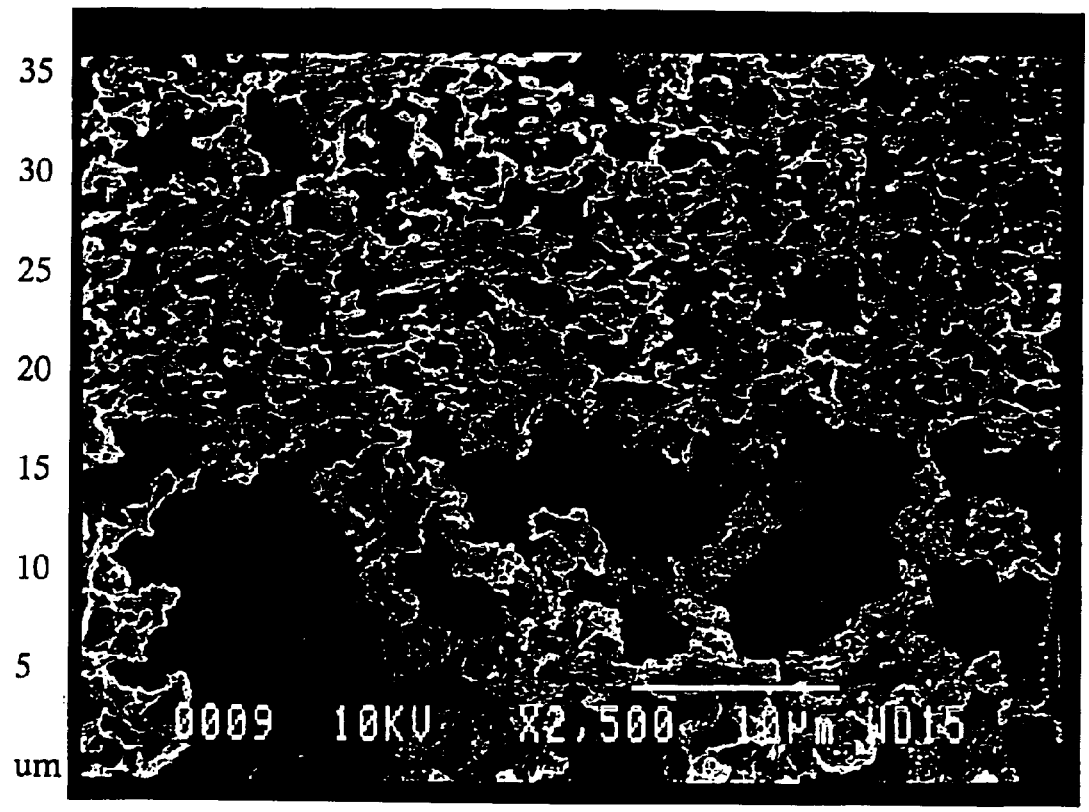

The resultant three-zone, geometrically symmetric, pore size asymmetric nylon microporous membrane was tested and reported in Table 1. For illustration, the three-zone asymmetric pore structure of this Actual Example Three membrane is shown in cross section by Scanning Electron micrograph in FIGS. 14a–b. It has a substantially larger pore size rating and a higher clean water flow rate than the membrane of Actual Example Two, and vastly greater than Actual Example One, in any of the common measurements of pore size and throughput. This again demonstrates the expected effect of higher maximum Dial-A-Por™ temperatures, resulting in larger pore sizes in each of the separate Membrane Zones. What was also clearly illustrated is, that, from substantially identical mother dopes, many different and unique products can be designed and produced by these methods and apparatus.

TABLE 1

| | | Mother Dope Characteristics | | | Zone Control Settings | | | | | |
| --- | --- | --- | --- | --- | --- | --- | --- | --- | --- | --- |
| Actual Example # | Membrane I.D. | Mother Dope Max Temp. (approx) Deg Celsius | Initial Bubble Point (IBP) (60/40 IPA) psig | Calculated IBP (= IPAx3) in D.I. H$_2$O psig | Zone 1 (Impreg'n) Target Max. Temp. Deg. Celsius | Zone 2 (Near) Target Max. Temp. Deg. Celsius | Zone 3 (Opposite) Target Max. Temp. Deg. Celsius | Zone 1 (Impreg'n) Coating Weight gm/sq.m. | Zone 2 (Near) Coating Weight gm/sq.m. | Zone 3 (Opposite) Coating Weight gm/sq.m. |
| 1 | 00B027-04 | 28 | 54 | 162 | 54.0 | 54.0 | 45.0 | 12.5 | 13 | 18.5 |
| 2 | 00B032-04 | 28 | 59 | 177 | 57.0 | 57.0 | 50.0 | 12.7 | 13 | 15.2 |
| 3 | 00B036-02 | 28 | 58 | 174 | 62.0 | 62.0 | 54.0 | 12.5 | 13.3 | 19.1 |

| | | In-Process Measurements | | | Final Membrane Measurements | | |
| --- | --- | --- | --- | --- | --- | --- | --- |
| Actual Example # | Membrane I.D. | Total Nylon Coating Weight gm/sq.m. | Forward Flow K-sub-L Bubble Point (60/40 IPA) psig | Sheet Thickness (Process Gage) mil | Initial Bubble Point (D.I. H$_2$O) psig | Water Flow Rate (D.I. H$_2$O) cc/min* | Coulter Porosimeter Mean Flow Pore Size micron |
| 1 | 00B027-04 | 44 | 15.3 | 6.67 | 40.1 | 142 | 0.503 |
| 2 | 00B032-04 | 43.9 | 10.9 | 7.05 | 29 | 231 | 0.738 |
| 3 | 00B036-02 | 44.9 | 8.3 | 7.46 | 21.5 | 483 | 1.007 |

*Equilvaent of cc/min @ five (5) psid for a forty-seven mm disc (thirteen and one-half, 13.5, sq, cm.)

Discussion of the Actual Examples

It can be seen from the above examples that a plurality of pore sizes can be effectively produced and placed in specific zones of a three-zone, geometrically symmetric nylon microporous membrane. It is believed that anyone of ordinary skill in the art can effectively design pore size symmetric or asymmetric structures, gradient density structures, and any one of many application specific structures while maintaining geometric symmetry by manipulating the pore sizes, coating weights, and application temperatures of the zones disclosed in these actual examples. Other structures are also believed easily realized, having controlled asymmetry in geometry as well.

In the above actual examples, it is believed that the geometrically symmetric and pore size asymmetric membranes produced have superior water flow rates when compared to membranes of equal pore size and integrity prepared in the traditional manners with a single dope, single zone design, as had been demonstrated in the previous patent applications discussed above (U.S. patent application Ser. Nos. 09/022,295, filed Feb. 11, 1998, of Meyering et al., Ser. No. 09/040,979, filed Mar. 18, 1998, of Meyering et al. and Ser. No. 09/040,816, filed Mar. 18, 1998, of Vining et al.) examples.

The above described actual examples are taken from real production data of salable membrane product. The present actual examples are intended to demonstrate reduction to practice of the concept of using three independent Dial-A-Por™ units fed from a single mother dope to produce a three-zone, reinforced membrane. Each Dial-A-Por™ unit was operatively connected to a unique Zone coating die, and independently processed the same mother dope to effect different Membrane Zone characteristics, as desired for the production of many possible unique products from the same dope formulation. The production of a plurality of possible pore size microporous membranes has now been achieved, using the above described production equipment The pore size has been simply and effectively "dialed in" on the production equipment to produce unique performance zones in each of the three zones of the three-zone reinforced membrane through temperature and zone coating weight manipulation.

Summary of the Actual Examples

The systems and methods of the present application for producing reinforced, three-zone membrane provided microporous membrane having markedly improved flow rates in filtration applications, for their pore size attributes, as compared to standard products now common in the membrane filtration industry. The relatively thin cross-sections of these three-zone, membrane products produced membrane cartridges having more surface area and even higher throughputs than prior products. These products clearly translated into a higher value added product for the filtration customer.

Thus, it should be apparent from the above actual examples that the systems and methods of manufacturing three-zone, reinforced microporous membrane has produced a membrane having a minimum functional thickness and maximum throughput at minimal pressure drops, high integrity and was economically produced in any one of a plurality of different pore sizes in each of the three zones. Further, the systems and methods for manufacturing three-zone, reinforced microporous membranes has eliminated the necessity for preparing at least one dope batch according to individual unique formulations for each pore size, thus resulting in significant cost savings and flexibility in the usage of dope batches.

It is believed that routine experimentation with substrates, pre-treatments, zone coating weights, polymers, dope viscosity, thickness, pore sizes, and orientations of the zones with respect to pore sizes will yield optimized membrane products which would have superior performance to existing membrane products. Other membrane applications which will benefit from the ability to customize zone performance will include (as examples), diagnostic products using body fluids, transfer membranes, separation devices, medical devices, and others which will become obvious to those skilled in the art of membrane science.

Based on the foregoing description, it should now be apparent that the use of the systems and the methods of the present application to produce any one of the plurality of possible three-zoned, reinforced membranes described herein, and as may be envisioned by those skilled in the art, will carry out the objects set forth hereinabove. It should also be apparent to those skilled in the art that the methods of the present application using the systems of the present application can be practiced to manufacture a variety of microporous membranes having at least a single layer of support material at least substantially embedded in a first zone of microporous membrane and having at least one zone of microporous polymer membrane on each opposed surface of the first zone. Similarly, the dope quench solutions, concentration and temperatures thereof as well as the speed at which the scrim is continuously fed through the apparatus can readily be determined by those skilled in the art.

It is important to note that the three-zone membrane produced by the system and methods of the present application will have a discontinuous pore structure with a continuous entanglement of the separate layers/zones of polymer such that the continuous, reinforced, microporous membrane produced is structurally integral.

After formation of the reinforced, three-zone microporous membrane 101 of the present application, the membrane may be treated in accordance with U.S. Pat. No. 4,473,474, the disclosure of which is herein incorporated by reference, to produce a cationically charge modified microporous membrane particularly suitable for the filtration of parenteral or biological liquid or, in accordance with U.S. Pat. No. 4,473,475, the disclosure of which is incorporated herein by references to produce cationically charged modified microporous membrane particularly suitable for the filtration of high purity water required in the manufacture of electronic components.

It is believed that experiments can be conducted to verify that the systems and methods of the present application will have the same, or similar results as described herein and in the previously mentioned pending applications or when using other ternary phase inversion polymers. It is presently believed that the systems and methods of the present application can be useful in the processing of a large number of ternary phase inversion polymers into reinforced, three-zone microporous membrane because of the similar chemical compositions and structures of the various phase inversion polymers.

Specifically, since nylon 66 is a member of a group of polymers that are capable of being processed into microporous membrane via the phase inversion process, the nature of this process is such that there is a strong probability that the methods and systems of the present application will be applicable to these other polymers as well, including, but not limited to, nylon 66, nylon 46, nylon 6, polysulfone, polyethersulfone, polyvinylidenediflouride (PVDF) and other ternary phase inversion polymers that form microporous structures through the phase inversion process.

While the systems and methods for making the articles described herein constitute preferred embodiments of the invention, it is to be understood that the invention is not limited to these precise systems and methods, and that changes may be made therein without departing from the scope of the invention which is defined in the appended claims.

What is claimed is:

1. A method for manufacturing a three-zone microporous membrane, the method comprising the steps of:
   providing at least one vessel for containing a ternary phase inversion polymer mother dope;
   formulating a ternary phase inversion polymer mother dope in the at least one vessel to effect dissolution and equilibrium mixing of the polymer, solvent and non-solvent;
   maintaining the mother dope in the vessel at a temperature sufficient to stabilize and maintain the dope formulated after cooling from the formulation temperature;
   providing a dope processing site having at least one dope application means;
   operatively connecting the at least one vessel to the dope processing site such that the mother dope is transported from the at least one vessel to the dope processing site;
   operatively positioning at least one thermal manipulation means between the at least one vessel and the dope processing site;
   thermally manipulating the mother dope transported from the at least one vessel in the at least one thermal manipulation means into any one of a plurality of different possible pore size producing dopes; and
   applying a predetermined one of the plurality of different possible pore size producing dopes received from the at least one thermal manipulation means to a scrim at the dope processing site to produce reinforced, three-zone microporous membrane.

2. The method of claim 1 further comprising the steps of:

operatively positioning at least a second dope application means at the dope processing site;

operatively positioning at least a second thermal manipulation means between the at least one vessel and the at least a second dope application means;

thermally manipulating the mother dope transported from the at least one vessel in the at least second thermal manipulation means into a predetermined one of a plurality of different possible pore size producing dopes; and applying the predetermined one of the plurality of different possible pore size producing dopes received from each of the two thermal manipulation means to a scrim that has had a thermally manipulated dope applied thereto from one of the at least two thermal manipulation means to produce reinforced, three-zone microporous membrane.

3. The method of claim 2 further comprising the steps of:

operatively positioning at least a third dope application means at the dope processing site;

operatively positioning at least a third thermal manipulation means between the at least one vessel and the at least third dope application means;

thermally manipulating the mother dope transported from the at least one vessel in at least the third thermal manipulation means into a predetermined one of a plurality of different possible pore size producing dopes; and applying the predetermined one of the plurality of different possible pore size producing dopes received from each of the three thermal manipulation means to a scrim at the dope processing sit to produce reinforced, three-zone microporous membrane.

4. The method of claim 3 further comprising the steps of:

providing at least a second vessel for containing a ternary phase inversion polymer mother dope, the dope having been exposed to a mixing temperature sufficient to effect dissolution and equilibrium mixing of the polymer, solvent and nonsolvent, the vessel and the dope contained therein being maintained at a temperature sufficient to stabilize and maintain the mixture after cooling from the mixing temperature.

5. The method of claim 3 further comprising the steps of:

providing at least a third vessel for containing a ternary phase inversion polymer mother dope, the dope having been exposed to a mixing temperature sufficient to effect dissolution and equilibrium mixing of the polymer, solvent and nonsolvent, the vessel and the dope contained therein being maintained at a temperature sufficient to stabilize and maintain the mixture after cooling from the mixing temperature.

6. The method of claim 4 wherein during the thermal manipulation step, the temperature of the mother dope is incrementally elevated to a temperature no higher than within about ±15° C. of the predetermined temperature.

7. A method for manufacturing three-zone microporous membrane, the method comprising the acts of:

providing at least one vessel for containing a ternary phase inversion polymer mother dope;

providing a dope processing site;

providing at least one pressure means, operatively connected to the at least one vessel, and the dope processing site for moving the dope from the at least one vessel to the dope processing site;

providing a dope transportation system, operatively connected to the at least one vessel and the dope processing site, for transfer of the dope from the vessel to the dope processing site;

providing at least one thermal manipulation means, operatively connected to the at least one vessel and the dope processing site, for transforming the dope from the at least one vessel into any one of a plurality of different possible pore size producing dopes; and providing at least three dope application means, operative at the dope processing site and operatively connected to the at least one thermal manipulation means, for applying the dope at the dope processing site to form three-zone microporous membrane.

8. The method of claim 7 further comprising the acts of:

operatively connecting at least a second thermal manipulation means to the at least one vessel, the dope transportation system and at least one of the three dope application means; and transforming the dope into any one of a plurality of different possible pore size producing dopes for application at the dope processing site by the at least one of the three dope application means.

9. The method of claim 8 further comprising the acts of:

operatively connecting at least a third thermal manipulation means to at least one vessel, the dope transporting system and at least another one of the three dope application means; and transforming the dope into any one of a plurality of different possible pore size producing dopes for application at the dope processing site by the at least a third dope application means.

10. The method of claim 7 further comprising the acts of:

operatively connecting at least a second and a third thermal manipulation means to the at least one vessel and at least two of the three dope application means respectively; and transforming the dope pumped from the at least one vessel to the second and the third thermal manipulation means into any one of a plurality of different possible pore size producing dopes for application at the dope processing site.

11. The method of claim 7 further comprising the acts of:

operatively connecting at least a second vessel to the dope transporting means, for containing a ternary phase inversion polymer dope.

12. The method of claim 11 further comprising the acts of:

operatively connecting at least a third vessel to the dope transporting system, for containing a ternary phase inversion polymer dope.

13. The method of claim 7 further comprising the acts of:

operatively connecting bypass means to the at least one thermal manipulation means, for diverting dope being transported from the at least one vessel to the dope processing site such that the dope is not processed by the at least one thermal manipulation means prior to delivery to the dope processing site.

14. The method of claim 8 further comprising the acts of:

operatively connecting bypass means to the at least the second thermal manipulation means, for diverting dope from at least one vessel to the dope processing site such that the dope is not processed by the at least second thermal manipulation means prior to delivery to the dope processing site.

15. The method of claim 9 further comprising the acts of:

operatively connecting bypass means to at least the third thermal manipulation means, for diverting dope from the at least one vessel to the dope processing site such that the dope is not processed by the at least third thermal manipulation means prior to being delivered to the processing site.

16. The method of claim 7 wherein the thermal manipulation means further comprises the acts of:

operatively positioning heating means in the at least one thermal manipulation means, for elevating the temperature of at least a portion of the dope to a temperature within about ±0.2° C. of a predetermined temperature, the predetermined temperature being selected from a calibrated characterization curve which describes the relationship between the dope being processed and the resulting pore size in at least one zone of the three-zone microporous membrane.

17. The method of claim 16 wherein the thermal manipulation means further comprises the acts of:

operatively connecting cooling means to the at least one thermal manipulation means, for cooling the dope after processing by the thermal manipulation means to a temperature such that the dope has a viscosity sufficient for processing by any one of the three dope application means to produce a microporous phase inversion membrane.

18. The method of claim 16 further comprises the acts of operatively connecting first heating means to the at least one thermal manipulation means, for elevating the temperature of at least a portion of the dope to a temperature within about 2° C. below the predetermined temperature; and operatively connecting second heating means to the first heating means, for further elevating the temperature of at least a portion of the dope to a temperature no higher than within about ±0.2° C. of the predetermined temperature.

19. The method of claim 18 further comprises the acts of:

further elevating the temperature of the dope to a temperature no higher than within about ±0.15° C. of the predetermined temperature utilizing the second heating means.

20. The method of claim 7 further comprising the act of:

operatively positioning means for controlling the thickness of the dope during application by the application means between the vessel containing the ternary phase inversion polymer and the do processing site.

21. The method of claim 7 further comprising the acts of:

operatively positioning means, for controlling the coating weight of the dope during application by the application means between the vessel containing the ternary phase inversion polymer and the dope processing site.

* * * * *